(12) United States Patent
Damodaran et al.

(10) Patent No.: US 7,992,194 B2
(45) Date of Patent: Aug. 2, 2011

(54) METHODS AND APPARATUS FOR IDENTITY AND ROLE MANAGEMENT IN COMMUNICATION NETWORKS

(75) Inventors: Suresh Damodaran, Coppell, TX (US); Greg Leitheiser, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 1428 days.

(21) Appl. No.: 11/374,721

(22) Filed: Mar. 14, 2006

(65) Prior Publication Data
US 2007/0220591 A1 Sep. 20, 2007

(51) Int. Cl.
G06F 7/04 (2006.01)
G06F 15/16 (2006.01)
G06F 17/30 (2006.01)
H04L 29/06 (2006.01)

(52) U.S. Cl. ............... 726/4; 713/156; 380/278

(58) Field of Classification Search .............. 713/156; 726/1–7, 17–19, 21; 380/277–278, 28; 705/67, 705/71, 76
See application file for complete search history.

(56) References Cited

U.S. PATENT DOCUMENTS

| | | | |
|---|---|---|---|
| 6,131,120 A | 10/2000 | Reid | |
| 6,260,111 B1 | 7/2001 | Craig et al. | |
| 6,289,382 B1 * | 9/2001 | Bowman-Amuah | 709/226 |
| 7,143,095 B2 * | 11/2006 | Barrett et al. | 707/10 |
| 7,343,628 B2 * | 3/2008 | Buchholz et al. | 726/28 |
| 2002/0010798 A1 | 1/2002 | Ben-Shaul et al. | |
| 2003/0028585 A1 | 2/2003 | Yeager et al. | |
| 2003/0140223 A1 | 7/2003 | Desideri | |
| 2003/0159036 A1 | 8/2003 | Walmsley et al. | |
| 2003/0163730 A1 | 8/2003 | Roskind et al. | |
| 2003/0163737 A1 | 8/2003 | Roskind | |
| 2003/0172280 A1 | 9/2003 | Scheidt et al. | |
| 2004/0003287 A1 | 1/2004 | Zissimopoulos et al. | |
| 2004/0064512 A1 | 4/2004 | Arora et al. | |
| 2005/0039019 A1 | 2/2005 | Delany | |
| 2006/0023887 A1 | 2/2006 | Agrawal et al. | |
| 2006/0053276 A1 | 3/2006 | Lortz et al. | |

FOREIGN PATENT DOCUMENTS
EP 1134955 A1 9/2001

OTHER PUBLICATIONS

International Searching Authority, "International Search Report," for counterpart PCT Application Serial No. PCT/US2007/05156 mailed on Mar. 24, 2008 (6 pages).

(Continued)

*Primary Examiner* — Taghi T Arani
*Assistant Examiner* — Narciso Victoria
(74) *Attorney, Agent, or Firm* — Patents on Demand, P.A.; Brian K. Buchheit; Scott M. Garrett

(57) ABSTRACT

Methods and apparatus for identity and role management in communication networks are disclosed. An example method for identity and role management in a communication network associates an entity with a key, associates the entity with a role, associates the key and the role with a signature, and enables the key, the role and the signature to be accessed through the communication network based on an identity of the entity.

40 Claims, 19 Drawing Sheets

OTHER PUBLICATIONS

International Searching Authority, "Written Opinion of the International Searching Authority," for counterpart PCT Application Serial No. PCT/US2007/05156 mailed on Mar. 24, 2008 (10 pages).

International Searching Authority, "International Preliminary Report on Patentability," for related PCT Application Serial No. PCT/US2007/005156 mailed on Sep. 25, 2008 (10 pages).

Digital Signature Standard (DSS), Federal Information Processing Standards Publication 186, May 19, 1994, 17 pages.

RIVEST, The MD5 Message-Digest Algorithm, MIT Laboratory for Computer Scient and RSA Data Security, Inc., Apr. 1992, 15 pages.

Kaliski et al, PKCS #1: RSA Cryptography Specifications Version 2.0, RSA Laboratories, Oct. 1998, 27 pages.

EASTLAKE, Domain Name System Security Extensions, IBM, Mar. 1999, 32 pages.

EASTLAKE, DSA KEYs and SIGs in the Domain Name System (DNS), IBM, Mar. 1999, 5 pages.

EASTLAKE, RSA/MD5 KEYs and SIGs in the Domain Name System (DNS), IBM, Mar. 1999, 5 pages.

Arends et al., DNS Security Introduction and Requirements, Mar. 2005, 21 pages.

Arends et al., Resource Records for the DNS Security Extensions, Mar. 2005, 30 pages.

Arends et al., Protocol Modifications for the DNS Security Extensions, Mar. 2005, 54 pages.

\* cited by examiner

METHODS AND APPARATUS FOR IDENTITY AND ROLE MANAGEMENT IN COMMUNICATION NETWORKS

FIELD OF THE DISCLOSURE

This disclosure relates generally to communication networks and, more particularly, to methods and apparatus for identity and role management in communication networks.

BACKGROUND

Secure communication among a community of users is critical given today's increased use of email and other types of Internet communication in business-to-customer, business-to-business, and business-to-independent consultant applications. An example of a business-to-customer application utilizing secure communication is a bank providing monthly notifications of account balances to its clients via email or banking software applications. An example of a business-to-business application utilizing secure communication is sending emails confirming receipt of invoices from a supplier. An example of a business-to-independent consultant application utilizing secure communication is transmittal of confidential client account access information to an independent personal financial advisor. Business-to-business and business-to-independent consultant scenarios also often employ secure collaboration among the parties involved. Such collaboration requires secure communication with authenticated and authorized access to information across organizational boundaries.

Secure communication has typically been described and addressed as a peer-to-peer communication problem, for example, between a party A and a party B. Parties A and B may be members of a large community where secure communication may occur between any pair of parties within the community, or only between pairs in which only a designated party, such as party A, is involved. The latter case typically occurs in business-to-customer applications. Existing solutions today, such as those based on the public key cryptography, typically require deployment of expensive new infrastructure and are plagued by bottlenecks and other inefficiencies.

Public key cryptography is used in many applications to secure network communications between parties. Public key cryptography employs public/private key pairs to secure communications by encrypting a message with a given public key such that the message may be decrypted only with the matching private key, and vice versa. The private key is a secret maintained by its owner. A significant hurdle in the implementation of public key cryptography systems is the distribution of public keys in a trustworthy manner.

Currently, digital certificates are a typical means for distributing public keys. For example, in public key infrastructure (PKI) systems, the digital certificate is a data structure used to bind a particular, authenticated user to a particular public key, thereby ensuring the integrity and authenticity of the public key transfer. Hence, a digital certificate is a digital representation of information including the name or some other identity associated with the subscriber, the subscriber's public key, the operational period of the digital certificate, the certification authority issuing the digital certificate and a digital signature or similar verifying mechanism corresponding to the certification authority.

PKI systems which enable the distribution of public keys using digital certificates have been historically unwieldy and unaffordable to all but the largest companies given the various representation formats for certificates and the complexity of the associated certificate allocation and revocation mechanisms. The high cost of implementing and using PKI systems and the associated digital certificates has deterred many small and medium-sized businesses from utilizing secure network communication and collaboration. Furthermore, social engineering methods have been utilized to corrupt the trust in PKI systems to obtain falsified digital certificates, a type of risk associated with any centralized trust authority.

Identity based encryption (IBE) is another public key cryptography technique that does not use digital certificates, but instead uses algorithms to generate matching public/private key pairs. IBE enables senders to encrypt messages for recipients without requiring the recipient's public key to be established, certified and published. The keys used for IBE are based on the identity of the recipient in the system and some other public parameters provided by a key generation server. The appropriate public key is generated based on the recipient's identity and other public parameters by an entity wishing to send an encrypted message to the recipient. Then, the key generation server provides the matching private key to the recipient of the message, who must also authenticate with the key generation server to receive the private key and, thereby, decrypt the message. In this way, all secure communications are monitored and managed from a centralized authoritative key server.

However, this centralized key server also provides a single point of failure and/or attack for an IBE system. Furthermore, the key server usually must be available to public networks in order to distribute its public parameters, yet this accessibility leaves the key server more vulnerable to attack by malicious users. Once a malicious user has obtained the value of the key generator's master key, then the malicious user may calculate all other keys. To mitigate this risk, the master key is changed periodically. However, periodically changing the master key significantly increases system complexity as all public and private keys must correspondingly change and all public and private keys generated based on the old master key must be revoked. Variations of IBE that relax the key escrowing features of IBE have been proposed, but they too suffer from the need for a key generation server, and the problems arising from partial sharing of secrets between the key generation server and network entities For example, email is a widely available means of communication among low-end users and much effort has been spent on securing emails using PKI and IBE systems. Although these secure email solutions provide the ability to exchange keys, they have not yet met the price and feature requirements of many users, resulting in limited deployment of secure email solutions. Additionally, other Internet-based communication, such as community bulletin boards or web sites providing secure message exchange, or secure web-based mail boxes for providing pair-wise secure message exchange between parties, are limited by a username/password mechanism for authentication and secure sockets layer (SSL) encryption for confidentiality. The use of username/password mechanisms are known to suffer from inherent security limitations, such as being prone to mishandling of passwords by users and attack by password cracking programs. However, migrating away from username/password mechanisms is difficult, especially given that deployment of PKI or IBE techniques can require significant up-front investment in terms of equipment (e.g., servers) and/or software development and configuration.

DETAILED DESCRIPTION

Figure 1:
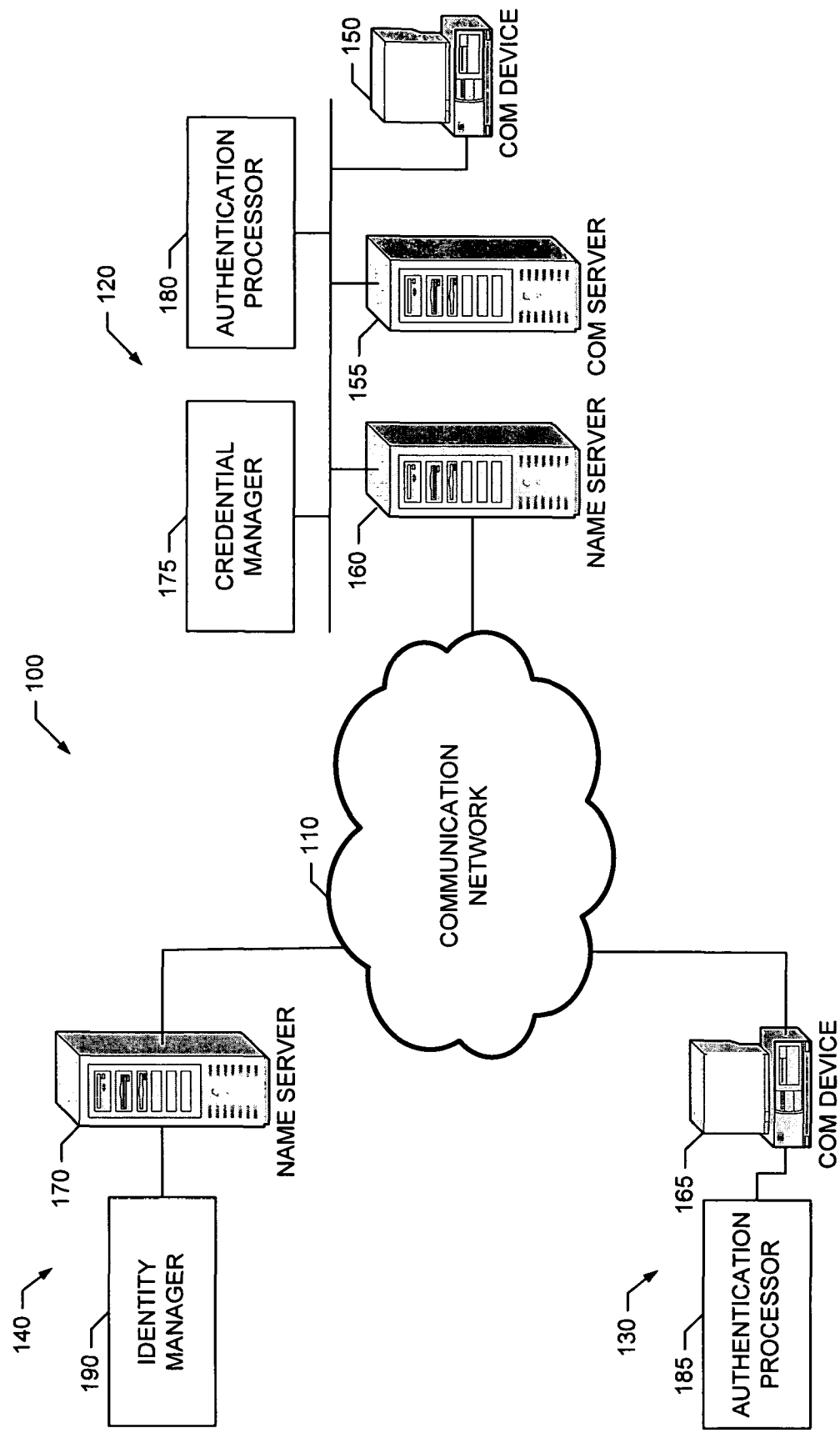
FIG. 1 is a block diagram of an example system for identity and role management.

FIG. 1 illustrates an example system 100 configured to implement distributed identity and role management for secure communications over a communication network 110 employing name servers, such as the widely deployed domain name servers used in the domain name system (DNS) of the Internet. The identity and role management system 100 enables provisioning (e.g., creation, allocation, distribution, modification and revocation) and use of digital identities corresponding to users in a community employing secure communication. Furthermore, the identity and role management system 100 enables provisioning and use of roles corresponding to users and facilitates secure communications based on user roles. For example, user roles could exist local to an organization (e.g., such as the chief executive officer of a particular company) or community wide (e.g., such as the chairperson of the parent teachers organization of a local school). To achieve secure communication, the identity and role management system 100 employs techniques to provision and use digital identities and to provision and use user roles which are compatible, because a role is meaningful only if it can be associated with an authentic digital identity.

Provisioning roles for secure communication requires verifiable binding of a verifiable role to a verifiable digital identity. The focus of secure communication has typically been on verification of a user's digital identity, with no focus on either verification of the user's role, or the binding of the user's role to the user's identity. As a result, any role or roles associated with a user identity in a secure communication environment has typically been pre-assigned. For example, when a new user previously joined a secure communication environment, a credentialing process typically assigned a predetermined role (if any) to the user. Even if there was a mechanism for a new user to suggest his or her role, the role was typically not verifiable within the secure communication system, but required, for example, a separate phone call or other "out-of-band" means. In contrast, the identity and role management system 100 provides mechanisms to readily verify a role of a user while verifying the user's identity, and to verifiably bind the verifiable role to the user's verifiable identity.

As described in greater detail below, the identity and role management system 100 enables or provides: (1) distributed identity management using resource records to provide storage and management of public keys in a distributed manner, (2) authentication protocols to allow an entity to verify the identity of another entity in a hierarchical manner using the resource records, (3) proper validation of security data to facilitate detection of unwanted communication (e.g., SPAM, SPIT, etc.) to an entity in the system, (4) distributed provisioning of roles and ability to distinguish between community-wide roles and local roles, (5) scalability in performance and cost, and (6) support of identity obfuscation to provide the communicating parties with anonymity. Thus, the identity and role management system 100 may be used to secure a wide variety of communication systems and networks, such as email systems, instant messaging (IM) systems, business-to-business communities connected via RosettaNet, EDI-based, other proprietary messaging schemes, etc.

Turning to FIG. 1, the example identity and role management system 100 includes a communication network 110 and depicts three example network sites 120, 130 and 140. For simplicity, the following disclosure focuses on the communication network 110 implemented as a computer communication network such as the Internet, but a person of ordinary skill in the art will appreciate that the techniques described herein may be employed with other types of communication networks and systems. For example, the communication network 110 could be any type of communication network including, a computer communication network, such as the Internet, a proprietary computer network, etc. or a wireless communication network, such as a mobile cellular network, a wireless digital network (e.g., WLAN, WiFi, WiMax), etc., or any combination of such communications networks or the like.

The network site 120 could correspond to, for example, a business or independent consultant site and includes a communication device 150, a communication server 155 and a name server 160. The communication device 150 may be any communication device configured to be communicatively coupled to the communication network 110. For simplicity, the following disclosure focuses on the communication device 150 implemented as a computer, such as a personal computer, but a person of ordinary skill in the art will appreciate that the techniques described herein may be employed with other types of communication devices. For example, the communication device 150 could be any type of communication device including a computer, such as a personal desktop computer, a laptop computer, a notebook computer, a personal digital assistant, or a mobile cellular telephone, etc.

The communication server 155 may be any communication server configured to be communicatively coupled to the communication network 110. For simplicity, the following disclosure focuses on the communication server 155 implemented as an email server, for example, such as a Microsoft Exchange email server or similar email server, but a person of ordinary skill in the art will appreciate that the techniques described herein may be employed with other types of communication servers. For example, the communication server 155 could be any type of communication server, such as an email server, an instant messaging server, a web server, an FTP server, a communications router and/or bridge, etc.

The name server 160 may be any type of name server configured to be communicatively coupled to the communication network 110. Typically, the name server 160 is configured to be accessible from any access point in the communication network 110 in order to simplify communication by translating human-readable identities for network entities into machine-readable identities capable of being processed by devices, applications, etc. communicatively coupled to the network 110, such as the communication device 150, the communication server 155, etc. The entities may be individual users accessing the communication network 110 (e.g., such as a user identified as Bob@foo.com) or network domains (e.g., such as domains identified as foo.com, com, etc.). The name server 160 performs the translation from human-readable identities to machine-readable identities based on the use of stored resource record (RR) sets and groups corresponding to each entity accessing the communication network 110 from the network site 120. For example, the name server 160 may store RRs corresponding to the network domain assigned to the network site 120 (e.g., such as foo.com), network identities for the communication device 150, the communication server 155 and the name server 160 (e.g., such as pc.foo.com, mail-server.foo.com and domain-server.foo.com, respectively) as well as network identities for individual users at the network site 120 (e.g., such as Bob@foo.com). For simplicity, the following disclosure focuses on the name server 160 implemented as a domain name server of the Internet's domain name system (DNS), but a person of ordinary skill in the art will appreciate that the techniques described herein may be employed with other types of name servers. For example, the name server 160 may be any type of name server, such as a domain name server, a communications router and/or bridge, or a mobile cellular system gateway node, serving node, location register, etc.

Similarly, the network site 130 includes a communication device 165 and could correspond to, for example, a customer or individual user site. The network site 140 includes a name server 170 and could correspond to, for example, a business site, an independent consultant site, or a communication network service provider, such as an Internet service provider (ISP), etc. For example, the network site 140 could correspond to the ISP used by the network site 130 to gain access to the communication network 110. In this case, the name server 170 would include RR sets or groups corresponding to the network domain for network site 140, as well as RR sets or groups for the entities accessing the communication network 110 at the network site 130 (e.g., such as the communication device 165 and any individual users of the communication device 165). A person of ordinary skill in the art will appreciate that many other possible network site configurations including any number of communication devices 150, 165, any number of communication servers 155 and/or any number of name servers 160, 170 are possible and supported by the techniques described herein.

To implement identity and role management in the example identity and role management system 100, the network site 120 includes a credential manager 175 and an authentication processor 180, the network site 130 includes an authentication processor 185 and the network site 140 includes an identity manager 190. Generally, the identity and role management system 100 utilizes public key cryptography to validate and secure communications over the communication network 110. As discussed above, public key cryptography employs public/private key pairs to secure communications by encrypting a message or other information with a public key such that the encrypted message or other information may be decrypted only with the matching private key, and vice versa. The private key is a secret maintained by a network entity that is the private key holder. The identity and role management system 100 then enables the public key corresponding to the entity's private key to be retrieved by others wishing to communicate with the entity. In the example identity and role management system 100, a network entity may be, for example, a network user, such as an individual person, a communication device (e.g., such as the communication device 150 and/or 165) a communication server (e.g., such as the communication server 155), an FTP server, an HTTP server, etc. Additionally or alternatively, a network entity may be a network domain represented by, for example, a name server (e.g., such as the name server 160 and/or 170).

Turning to network site 120, as previously discussed, the name server 160 is configured to be accessible from any access point of the communication network 110 and stores RR groups containing RRs corresponding to each network entity accessing the communication network 110 from the network site 120. The credential manager 175 is configured to store and/or modify the RR groups in the name server 160 corresponding to entities at the network site 120 to include the following information and RRs for each entity: (1) one or more identities associated with the entity, (2) one or more RR sets, wherein each RR set may contain a public key corresponding to one of the entity's private keys and zero or more RRs containing local and/or community roles of the entity (if applicable), and (3) one or more RRs containing one or more signatures over some or all of the of the RRs in each RR set. For example, an entity's identity may correspond to any identification information resolvable by the name server to uniquely associate the entity with a corresponding RR group or groups. Such information may include, but is not limited to, an email address, a domain name, a network address (such as an Internet Protocol (IP) address), an instant messaging identity, etc.

Figure 3:
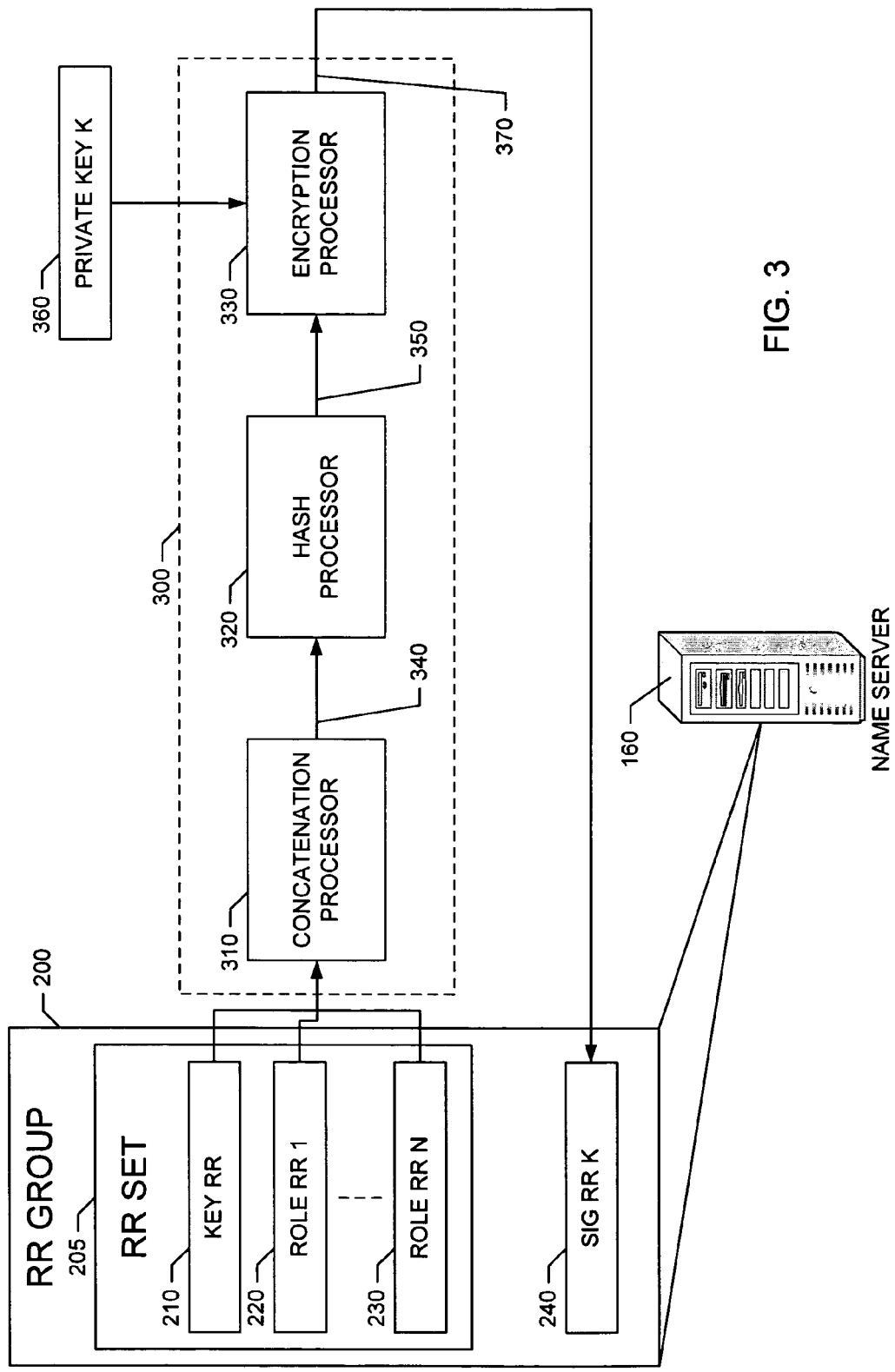
FIG. 3 is a block diagram of a first example credential manager for use in the example system of FIG. 1.
Figure 4:
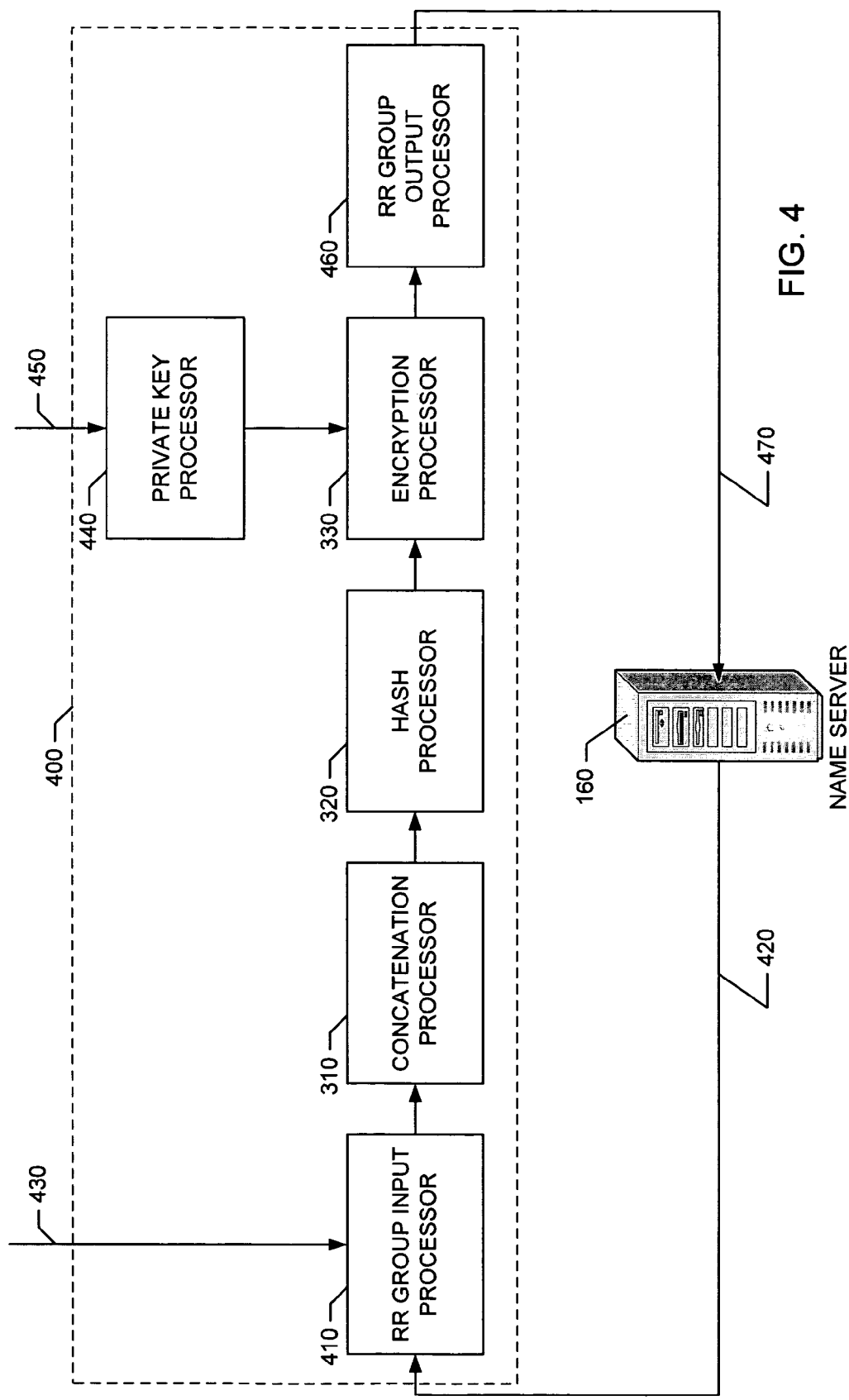
FIG. 4 is a block diagram of a second example credential manager for use in the example system of FIG. 1.

In the case of an example name server 160 implemented as a domain name server 160, the DNS security extensions defined in Internet Request for Comments (RFC) 2535, and updated, clarified and refined in RFCs 4033, 4034 and 4035, which are available at http://www.ietf.org/rfc.html and incorporated herein by reference in their entireties, enable the domain name server 160 to store public keys via the KEY RR and signatures via the SIG RR. Additionally, a ROLE RR may be defined to support storage of a role associated with an entity served by the name server 160. An example RR group for use by the name server 160 is shown in greater detail in FIG. 2 discussed below. The credential manager 175 may be implemented as a stand-alone device, and/or as an application executed by the name server 160, etc. More detailed examples of credential managers which may be used to implement the credential manager 175 are illustrated in FIGS. 3 and 4 discussed below.

The counterpart to the credential manager 175 in the role and identity management system 100 is an authentication processor, such as the authentication processors 180 and 185 included in the network sites 120 and 130, respectively. The authentication processors 180 and 185 are configured to retrieve credential information included in a name server corresponding to an entity with which communication is desired to, for example, authenticate the entity by verifying the entity's identity and/or role. For example, if the name servers 160 and 170 are domain name servers of the Internet's DNS, then the authentication processors 180 and 185 may take advantage of the DNS protocol and hierarchy to route requests (e.g., DNS lookups) for credential information corresponding to a particular network entity (e.g., network user or domain) to the appropriate domain name server (e.g., name server 160 or 170) storing the RR group for the particular entity based on the identity of the network entity.

As a hypothetical example, suppose network site 120 corresponds to the domain foo.com served by the domain name server 160. If a user at network site 130 wishes to communicate with a user Bob at network site 120 having a network identity of Bob@foo.com, then the authentication processor 185 of network site 130 may be configured to request credential information associated with Bob which will be routed though the DNS based on the identity Bob@foo.com to the domain name server 160 servingfoo.com. The domain name server 160 may be configured to return the RR group corresponding to user Bob in response to the query by the authentication processor 185. Based on the RRs included in the RR group, the authentication processor 185 may then authenticate user Bob as the intended and proper recipient of the communication by verifying user Bob's identity and role information. After authentication by the authentication processor 185, the public key included in the RR group for user Bob may be used to encrypt, and thereby make confidential, communications transmitted to Bob@foo.com.

Figure 5:
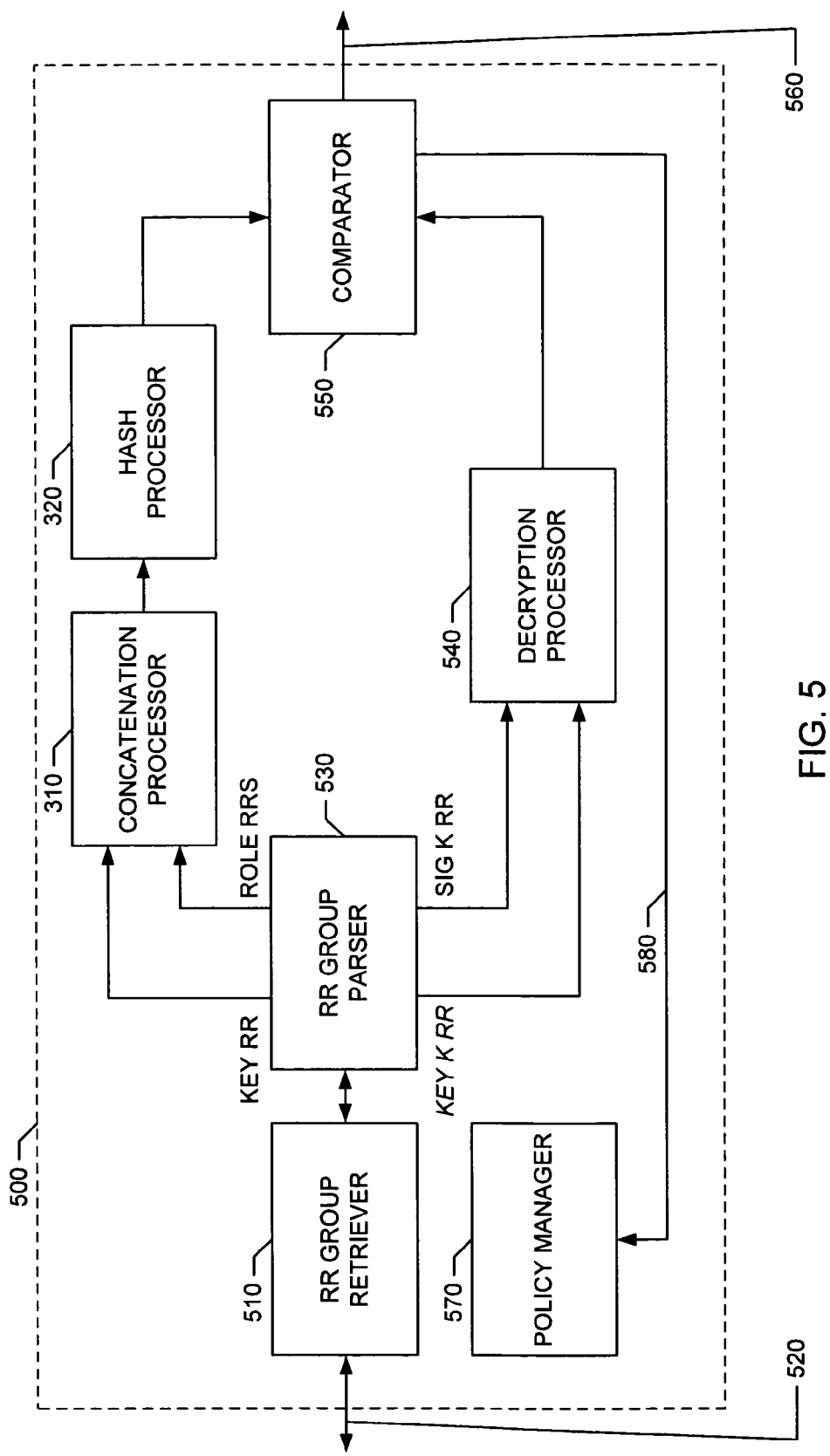
FIG. 5 is a block diagram of an example authentication processor for use in the example system of FIG. 1.

In the case of the network site 130, the authentication processor 185 may be triggered by, for example, an application executing on the communication device 165 to authenticate intended recipients of communications and/or senders of received communications. Additionally or alternatively, as in the case of network site 120, the authentication processor 180 may be triggered, for example, by the communication server 155 to authenticate intended recipients of any communications and/or senders of received communications processed by the communication server 155. Furthermore, the authentication processors 180 and/or 185 may be implemented as stand-alone processors, an application executed by the communication device 150, 165, an application executed by the communication server 155, and/or an application executed by the name server 160, etc. A more detailed example of an authentication processor which may be used to implement the authentication processors 180 and/or 185 is shown in FIG. 5 discussed below.

Figure 6:
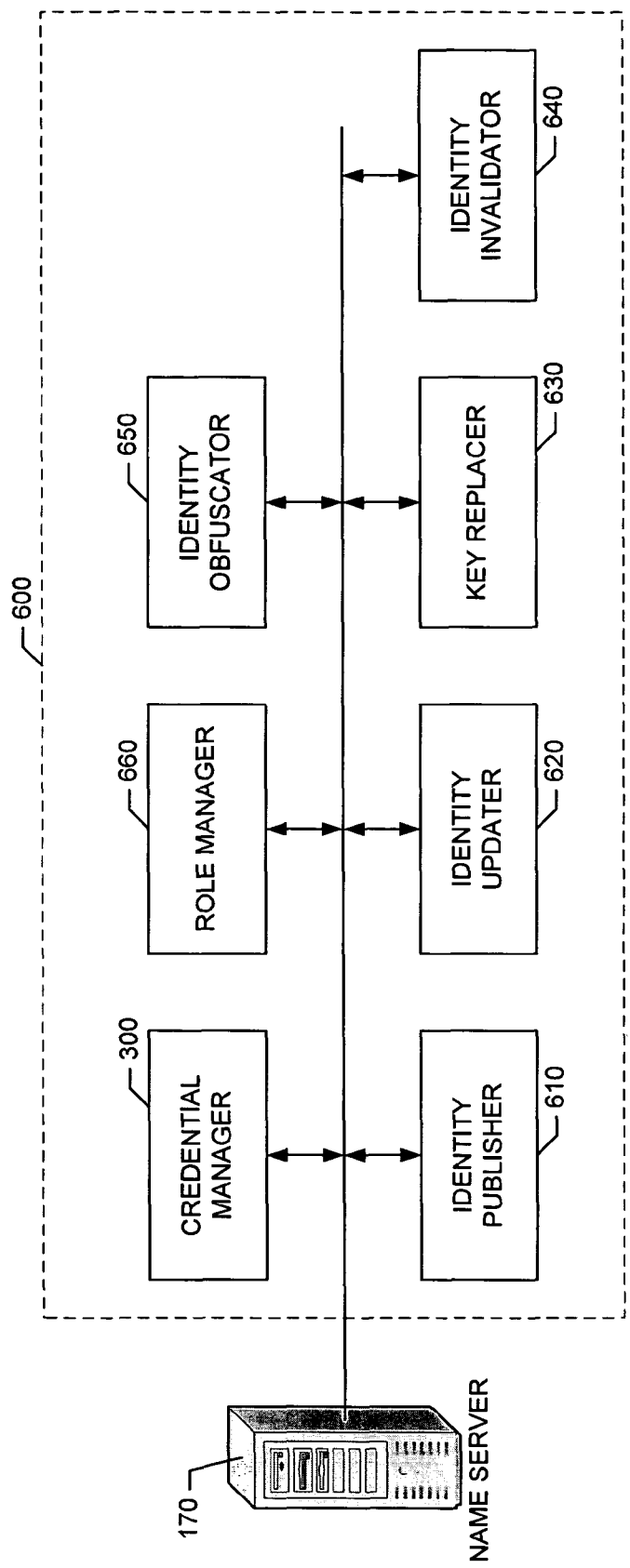
FIG. 6 is a block diagram of an example identity manager for use in the example system of FIG. 1.

Finally, the example of FIG. 1 depicts network site 140 as including an identity manager 190. The example identity manager 190 implements, at a minimum, the functionality of the credential manager 175 to allow credential information to be included in RRs of RR groups stored in the name server 170. The identity manager 190 may also provide additional functionality to support identity and role management, including any or all of: identity publishing, identity updating, key replacement, role management, identity obfuscation and/or identity invalidation. A more detailed example of an identity manager which may be used to implement the identity manager 190 is shown in FIG. 6 discussed below.

Figure 2:
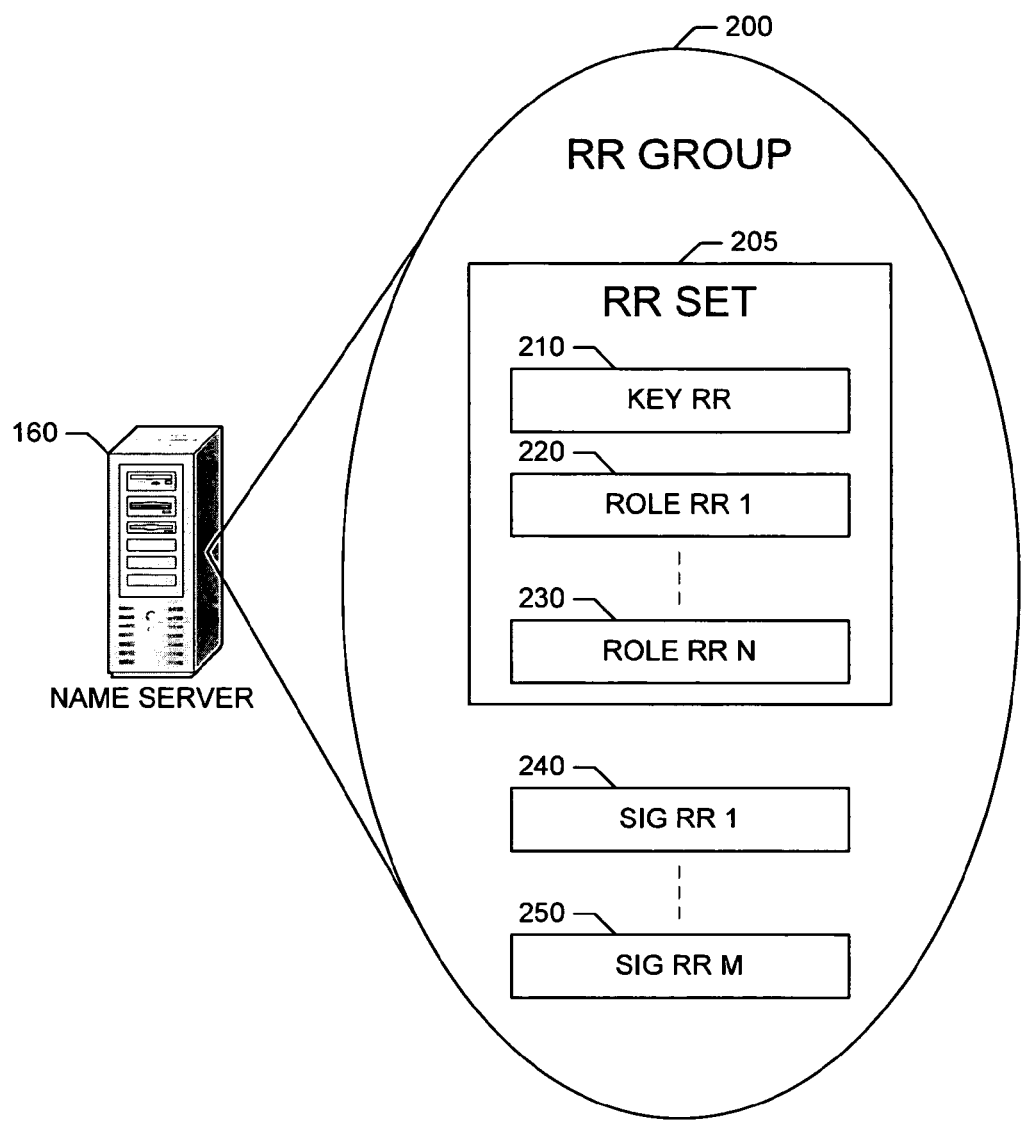
FIG. 2 illustrates an example Resource Record (RR) group for use in the example system of FIG. 1.

An example Resource Record (RR) group 200 for use in the example identity and role management system 100 of FIG. 1 is illustrated in FIG. 2. The example RR group 200 is stored in, for example, the name server 160 and associated with a particular network entity accessing the communication network 110 via the network site 120 of FIG. 1. The example RR group 200 includes an RR set 205 that has a KEY RR 210 and zero or more ROLE RRs 220-230. The RR group 200 also includes one or more SIG RRs 240-250 associated with the RR set 205. A particular network entity may be associated with one or more RR groups 200. Furthermore, in a typical application, a particular network entity may (but is not required to) be uniquely associated with a particular name server and, thus, all RR groups 200 associated with the particular entity may be stored in the corresponding particular name server.

The KEY RR 210 contains the public key corresponding to the public/private key pair assigned to the network entity associated with the RR group 200. Additionally, the KEY RR 210 may include information indicating the public key encryption algorithm associated with the public/private key pair. Example public key encryption algorithms that may be used in the example identity and role management system 100 include the US Digital Signature Algorithm (DSA) and RSA/MD5 specified in Internet RFCs 2536 and 2537, respectively, which are available at http://www.ietf.org/rfc.html and incorporated herein by reference in their entireties. An example format for KEY RR 210 is described in Internet RFC 2535, incorporated by reference above. In the example identity and role management system 100, the KEY RR 210 may be associated with network users, domains, zones, hosts or any other entity named in the name server 160. As discussed above in connection with FIG. 1, the KEY RR 210 may be returned by the name server 160 in response to a request by an authentication processor for credential information corresponding to the entity associated with the KEY RR 210.

The zero or more ROLE RRs 220-230 contain role information for the network entity associated with the RR group 200. As discussed above, roles could exist local to an organization (e.g., such as the chief executive officer of a particular company) or community wide (e.g., such as the chairperson of the parent teachers organization of a local school). The RR group 200 is capable of including more than one ROLE RR 220-230, thereby allowing an entity to be associated with more than one role if applicable. As discussed above in connection with FIG. 1, the ROLE RRs 220-230 may be returned by the name server 160 in response to a request by an authentication processor for credential information corresponding to the entity associated with the ROLE RRs 220-230.

The one or more SIG RRs 240-250 contain a corresponding one or more signatures to facilitate integrity and/or authentication checking of one or more RRs in the RR group 200 and/or the identity of the entity associated with the RR group 200 (e.g., by associating an entity with a particular public key contained in the KEY RR 210, the identity of the entity may be authenticated by verifying the authenticity of the public key). For example, the RR group 200 includes the entity's public key in KEY RR 210 and the entity's zero or more roles in ROLE RRs 220-230. A signature for inclusion in, for example, SIG RR 240 may be generated by encrypting the information contained in the KEY RR 210 and/or the zero or more of the ROLE RRs 220-230 based on a signer's private key. By decrypting the signature with the signer's corresponding public key, the information contained in the KEY RR 210 and/or one or more of the ROLE RRs 220-230 may be authenticated based on the trust associated with the signer. Furthermore, because the signature contained in SIG RR 240 is based on signing over the KEY RR 210 and the ROLE RRs 220-230, an authenticator may authenticate the entity's key information and role information in one pass provided: (1) the authenticator possesses the signer's public key corresponding to the signature in the SIG RR 240 and (2) the authenticator trusts the signer's public key. Techniques for generating signatures and authentication based on signatures are discussed in more detail below.

The SIG RRs 240-250 may also include information indicating the public key encryption algorithm associated with the private key used to generate the signature. Example public key encryption algorithms that may be used in the example identity and role management system 100 include DSA and RSA/MD5 specified in Internet RFCs 2536 and 2537, respectively, incorporated by reference above. An example format for SIG RRs 240-250 is described in Internet RFC 2535, incorporated by reference above. As discussed above in connection with FIG. 1, the SIG RRs 240-250 may be returned by the name server 160 in response to a request by an authentication processor for credential information corresponding to the entity associated with the SIG RRs 240-250.

Three types of signatures may be supported by the identity and role management system 100 and contained in the SIG RRs 240-250 included in a particular RR group 200, namely, self signed signatures, domain signed signatures and community signed signatures. The different types of signatures may support different authentication mechanisms having different strengths and weaknesses, thereby providing significant flexibility. Typically, a signature is generated over all of the entity's identifying information contained in the KEY RR 210 and the ROLE RRs 220-230 included in RR group 200 associated with the entity. As discussed in more detail in the following disclosure, the signature may be created using any well-known hashing scheme to create a hash result, which may then be encrypted with an appropriate signer's private key to generate the corresponding signature for inclusion in one of the SIG RRs 240-250.

Self signed signatures may be created by signing an entity's RR group 200 (e.g., the KEY RR 210 and ROLE RRs 230-230) with the entity's private key corresponding to the public key included in KEY RR 210. A person of ordinary skill in the art will recognize that a self signed signature should not be used to authenticate the entity's identity, but may be used to validate the integrity of the information included in the RR group 200.

Domain signed signatures may be created by signing the entity's RR group 200 with a private key associated with the domain in which the entity resides (e.g., such as the domain associated with the network site 120 of FIG. 1 for an entity configured to access the communication network 110 from that network site). A person of ordinary skill in the art will recognize that a domain signed signature may be used to authenticate the entity as a valid member of the signing domain, as well as to validate the integrity of the RR group 200. Furthermore, as illustrated below, domain signed signatures may be chained to create a lineage of trust through a domain tree (e.g., such as a DNS tree), potentially reaching all the way to the root node of the tree.

Community signed signatures may be created by signing the entity's RR group 200 with a private key corresponding to a trusted community leader. Community signed signatures allow groups of entities (e.g., network users and/or network domains) from different network domains (e.g., from different nodes of the DNS tree) to be collectively regarded as a community (and, e.g., having a particular role in that community) regardless of their hierarchy in the domain tree. A person of ordinary skill in the art will recognize that a community signed signature allows all members of the community possessing the trusted signer's public key to authenticate the entity as a member of the community. Furthermore, if a community signed signature is used to sign identity information in an RR group associated with a network domain (e.g., the RR group 200), then all descendents of that network domain may be considered to be members of that community and authenticated based on: (1) the community signed signature in the domain's RR group and then (2) the domain signed signatures in the RR groups for the descendents of the domain.

A block diagram of a first example credential manager 300 that may be used to implement the credential manager 175 of FIG. 1 is shown in FIG. 3. The example credential manager 300 may be configured to process the KEY RR 210 and the ROLE RRs 220-230 of the RR group 200 stored in the name server 160 to determine the signature to include in the one or more SIG RRs 240-250. The credential manager 300 includes a concatenation processor 310, a hash processor 320 and an encryption processor 330. Generally, the concatenation processor 310 determines a potentially variable-length bit string result 340 from information contained in the RR group 200 for input to the hash processor 320. The hash processor 320 then takes the variable length concatenation result 340 and processes it with a hash function to determine a predetermined, fixed length bit string result 350. Finally, the encryption processor 330 takes the fixed length hash result 350 and processes it with a predetermined encryption algorithm having private key 360 as an input to generate a signature result 370 to be included in, for example, the SIG RR 240 as shown.

More specifically, the concatenation processor 310 may be configured to concatenate some or all of the digital information included in the KEY RR 210 and/or the ROLE RRs 220-230 to generate the concatenation result 340 that comprises, for example, a bit string for input to the hash processor 320. Typically, the information included in the KEY RR 210 will have a predetermined, fixed length based on the public key encryption algorithm corresponding to the public key included in this RR. However, the information included in the zero or more ROLE RRs 220-230 may be variable length depending on the number of ROLE RRs, the role information stored in a particular ROLE RR, etc. Additionally, the concatenation processor 310 may be configured to allow a user to select which fields of information contained in the KEY RR 210 and/or ROLE RRs 220-230 are to be processed. Therefore, the resulting concatenated bit string generated as the concatenation result 340 of the concatenation processor 310 will typically have a variable length.

However, public key encryption algorithms typically are designed to encrypt input bit strings having a predetermined, fixed length. Therefore, the example credential manager 300 includes a hash processor 320 to process the variable length concatenation result 340 to determine a fixed length hash result 350 that may be encrypted by a public key encryption algorithm. To generate its fixed length hash result 350, the hash processor 320 may be configured to use any hash function to convert the variable length concatenation result 340 into a fixed length bit string having the proper length for input to the encryption processor 330. Examples of possible hash functions which may be implemented by the hash processor 320 include the MD-2, MD-4 and MD-5 message digest algorithms described in Internet RFCs 1319, 1320 and 1321, respectively, available at http://www.ietf.org/rfc.html and incorporated herein by reference in their entireties, and the Secure Hash Standard (SHS) family of algorithms described in the National Institute of Standards and Technology (NIST) Federal Information Processing Standards Publication (FIPS) 180-1, which is incorporated herein by reference in its entirety. Furthermore, a person of ordinary skill in the art will recognize that the concatenation processor 310 may be eliminated if the hash processor 320 is configured, for example, to serially process the information contained in the KEY RR 210 and/or the ROLE RRs 220-230.

The encryption processor 330 is configured to implement a public key encryption algorithm to encrypt the hash result 350 based on an input private key 360. The private key 360 may correspond, for example, to the entity associated with the RR group 200 in the case a generating a self signed signature, to a domain to which the entity associated with the RR group 200 belongs in the case of a domain signed signature, or to a community leader of a community to which the entity associated with the RR group 200 belongs in the case of a community signed signature. The encryption processor 330 may implement any public key encryption algorithm, such as DSA or RSA/MD5 specified in Internet RFCs 2536 and 2537, respectively, incorporated by reference above. The result of encrypting the hash result 350 based on the private key 360 becomes the signature result 370 for inclusion in, for example, the SIG RR 240. The encryption processor 330 may also be configured to store additional information in the SIG RR 240, such as identity information corresponding to the signing entity associated with the private key 360, the type of public key encryption algorithm used to generate the signature, etc.

A block diagram of a second example credential manager 400 which may be used to implement the credential manager 175 of FIG. 1 is shown in FIG. 4. Like the credential manager 300 of FIG. 3, the credential manager 400 is configured to process entity information including, for example, KEY RRs 210 and ROLE RRs 220-230 of RR groups 200 stored in the name server 160 to determine signatures for inclusion in corresponding SIG RRs 240-250 of these RR groups 200. To perform this processing, the example credential manager 400 also includes a concatenation processor 310, a hash processor 320 and an encryption processor 330 as described above in connection with FIG. 3. However, the example credential manager 400 is further configured to process a plurality of RR groups 200 for a respective plurality of entities served by the name server 160. Additionally, the encryption processor 330 supports determination of a plurality of signatures to be included in the RR group 200 for each entity served by the name server 160.

The example credential manager 400 includes an RR group input processor 410 configured to read existing RR groups 200 already stored in the name server 160 via input 420, as well as process new RR groups 200 via input 430. For example, the RR group input processor 410 may be configured to read an RR group or groups 200 corresponding to a specified entity or group of entities from the name server 160 via the input 420 and, if an RR group or groups 200 are not available via the input 420, to obtain a new RR group or groups 200 via the input 430. The RR group input processor 410 then provides these RR group or groups 200 as input to the concatenation processor 310 for processing as described above in connection with FIG. 3.

The credential manager 400 also includes a private key processor 440 to provide one or more private keys to the encryption processor 330 to generate one or more corresponding signatures over the contents of the RR group or groups 200 provided by the RR group input processor 410. The private key processor 440 may be configured to accept the private keys and any associated identification information via input 450. Additionally or alternatively, the private key processor 440 may be configured to generate private key/public key pairs and provide the generated private keys to the encryption processor 330. In this case, the private key processor 440 would also be configured to provide the corresponding public keys to the RR group input processor 410 via the input 430 for inclusion in the appropriate RR group 200 (e.g., such as for self signed signature generation wherein the private key processor 440 generates the private key and public key to associate with a particular entity).

Finally, the example credential manager 400 also includes an RR group output processor 460 configured to, for example, collate the SIG RRs 245-250, as well as the KEY RRs 210 and ROLE RRs 220-230, for inclusion in the RR groups 200 processed by RR group input processor 410. The RR group output processor 460 then writes the collated RR group information to the name server via output 470.

A block diagram of an example authentication processor 500 that may be used to implement the authentication processors 180 and/or 185 of FIG. 1 is shown in FIG. 5. The authentication processor 500 is configured to retrieve credential information, such as information generated by the credential managers 300 and/or 400 of FIGS. 3 and 4, respectively, to facilitate authentication of an entity with which communication is desired. A network entity (e.g., network user or network domain) that wishes to participate in the secure communications and, thus, support authentication of the entity, may utilize the credential manager 300 or 400 to publish credential information in an RR group 200 having KEY RR 210 that contains the entity's public key, zero or more ROLE RRs 220-230 that contain the entity's roles, if any, and one or more SIG RRs 240-250 that contain corresponding one or more signatures that sign the KEY RR 210 and ROLE RRs 220-230 for the entity. Each published SIG RR 240-250 may also include a reference to the signer whose private key was used to generate the signature to sign the RR group 200. The capability to have more than one SIG RR 240-250 in the RR group 200 provides an authenticator of the entity with a choice of which signature to verify and, hence, which signer to trust, thereby supporting considerable flexibility in the authentication scheme implemented by the authenticator.

For example, if the authenticator simply requires verification of the integrity of the entity's public key, authenticating the RR group 200 based on a SIG RR 240-250 containing a self signature derived from the entity's own private key and verified based on the corresponding public key included in KEY RR 210 might be sufficient. However, in other situations, it might be necessary to validate the entity as a known member of an appropriate domain. In this instance, the authenticator may validate a domain signed signature included in a corresponding SIG RR 240-250 to authenticate the entity's RR group. Because each SIG RR 240-250 may provide a reference to the signer (e.g., another network entity) corresponding to the included signature, this reference may be used to look up the signer's public key using the same retrieval mechanism originally used to retrieve the RR group 200 corresponding to the entity currently being authenticated.

To better understand authentication based on domain signed signatures, consider the example of FIG. 1 in which the communication network 110 corresponds to the Internet and the name servers 160 and 170 correspond to domain name servers included in the Internet's DNS. In such a scenario, when an authenticator wishes to retrieve the public key of a network entity to engage in secure communications, the authenticator initially performs a DNS lookup for that entity. The DNS system will return the RR group 200 associated with the entity in response to the lookup, including the KEY RR 210, the zero or more ROLE RRs 220-230 and the one or more SIG RRs 240-250. The authenticator may now examine the signatures included in the SIG RRs 240-250 and determine which signature is to be used for authentication based on an authentication policy implemented by the authenticator. For example, if the selected signature requires a particular domain's public key, the authenticator must then obtain the validated public key associated with the domain. Validating the domain key may require validation up the DNS chain until a trusted signer is encountered. Once the authenticator reaches a trusted signer, the authenticator knows that signatures created by the trusted signer are trustworthy and, also, that the public key associated with the trusted signer is authentic. The authenticator then uses this authenticated public key to inspect the next signature down the chain. Once the entire chain has been validated, including the information contained in the RR group 200 associated with the particular entity being authenticated, the authenticator may consider the entity to be authentic and, thus, the entity's public key and role information may be processed accordingly. A person of ordinary skill in the art will recognize that it is not always necessary to verify the entire chain, especially if the authenticator is in possession of trusted public keys associated with signers within the chain.

Continuing with this example based on the Internet and DNS, a community signed signature based on a trusted community leader may be included in a SIG RR 240-250 associated with an entity at any level of the DNS hierarchy. The community signed signature may be used by an authenticator to authenticate the entity and any of the entity's descendents (e.g., in the case wherein entity is a network domain) as members of that particular community. Thus, an authenticator who, for example, is also a member of the community and considers the community leader to be a trusted signer may then validate the entity as a community member based on the community leader's public key. A person of ordinary skill in the art will appreciate that authentication based on a community framework is compatible with the DNS hierarchy, yet allows for arbitrary groupings of entities outside the DNS hierarchy.

Furthermore, if signature verification fails for a particular signature (e.g., self signed, domain signed or community signed) contained in the SIG RRs 240-250 associated with the particular network entity being authenticated, the authenticator may attempt to validate another signature in another of the SIG RRs 240-250. For example, the self signed signature associated with a particular network entity may be valid while the domain signed signature is invalid, or the domain signed signature may be invalid while the community signed signature is valid. In such circumstances, the interpretation of signature verification failures and/or successes, and the actions taken in response by the authenticator, are dependent on the authentication policy enforced by the authenticator. The network entity being authenticated has no role to play in authentication process (other than publishing its credential information in its associated RR group 200), thereby allowing an authenticator maximum flexibility in its authentication policy and, for example, tailoring of the policy for specific communities and/or trusted signers.

Turning to FIG. 5, the example authentication processor 500 includes an RR group retriever 510 configured to retrieve an RR group 200 associated with a network entity to be authenticated. The RR group retriever 510 may generate a request (e.g., such as a DNS lookup query) for the RR group 200 via the interface 520, which may be routed over a communication network (e.g., such as the communication network 110 of FIG. 1) to the appropriate name server (e.g., such as the name server 160) storing the RR group 200 for the particular entity to be authenticated. The appropriate name server responds to the query by sending the RR group 200 over, for example, the communication network 110 to be received by the RR group retriever 510 via the interface 520.

The example authentication processor 500 also includes an RR group parser 530 to parse the RR group 200 retrieved by the RR group retriever 510. The RR group parser 530 may parse the RR group 200 into its constituent RRs, such as the KEY RR 210, the zero or more ROLE RRs 220-230 and the one or more SIG RRs 240-250. Additionally, the RR group parser 530 may parse individual information fields included in these constituent RRs, such as, for example, the public key and the public key encryption algorithm type included in the KEY RR 210, the signature or signatures, signer identity or identities and/or the public key encryption algorithm type or types included in the one or more SIG RRs 240-250, etc. Furthermore, the RR group parser 530 is configured to determine the public key associated with a particular signature parsed from the SIG RRs 240-250 to be used to authenticate the RR group 200. For example, if the particular signature is a self-signed signature, the RR group parser 530 will use the parsed public key included in the KEY RR 210 as the public key to verify the self-signed signature. Alternatively, if the signature is a domain-signed or community signed signature, the RR group parser 530 may use the corresponding signer identity information included in the appropriate SIG RR 240-250 to determine whether the required signer's public key is already available locally to the authentication processor 500 (e.g., in a memory not shown) and available to verify the signature. If the signer's public key is not available locally, the RR group parser 530 may command the RR group retriever 510 to retrieve the RR group 200 associated with the signer to obtain its public key.

After obtaining the signature to be used for authentication and the signer's public key associated with the signature, the RR group parser 530 provides this information to a decryption processor 540 (e.g., via the SIG K RR and KEY K RR interfaces, respectively, shown in FIG. 5). The decryption processor 540 is configured to decrypt the signature based on the signer's public key. The decryption processor 540 may implement a predetermined public key decryption algorithm or select between multiple possible decryption algorithms based on the public key encryption type included in the appropriate SIG RR 240-250 and parsed by the RR group parser 530. Examples of types of public key decryption algorithms which may be supported by the decryption processor 540 include DSA and RSA/MD5 specified in Internet RFCs 2536 and 2537, respectively, incorporated by reference above. The decryption processor 540 then provides its decryption result to a comparator 550 as shown in FIG. 5.

Referring to the example credential manager 300 of FIG. 3, the result of decrypting the signature based on the signer's public key corresponds to the hash result output by the hash processor 320. Thus, to verify the decryption result of the decryption processor 540, the authentication processor 500 also includes the concatenation processor 310 and the hash processor 320 to concatenate and hash, respectively, the information included in the KEY RR 210 and zero or more ROLE RRs 220-230 as parsed by the RR group parser 530 (and provided, e.g., via the KEY RR and ROLE RRs interfaces shown in FIG. 5). The processing performed by the concatenation processor 310 and the hash processor 320 is described in greater detail above in the discussion of FIG. 3.

To compare the decryption result from the decryption processor 540 and the hash result from the hash processor 320, the example authentication processor 500 includes the comparator 550. The comparator 550 may be configured to perform, for example, a bit-wise comparison of the decryption result and the hash result. Then, if the decryption result and the hash result match, the comparator 550 may indicate via an output 560 that verification based on the signature provided to the decryption processor 540 succeeded. Conversely, if the decryption result and the hash result do not match, the comparator 550 may indicate via the output 560 that verification based on the signature provided to the decryption processor 540 failed.

The example authentication processor 500 may also include a policy manager 570 configured to implement policies addressing scenarios in which verification of a signature fails. For example, the policy manager 570 may be configured to allow the authentication processor 500 to process another signature included in the SIG RRs 240-250 parsed by the RR group parser 530 to verify the RR group 200 being authenticated. The policy manager 570 may be triggered by, for example, an output 580 from the comparator 550 indicating failure of a signature verification attempt.

A block diagram of an example identity manager 600 that may be used to implement the identity manager 190 of FIG. 1 is shown in FIG. 6. As discussed above in the description of FIG. 1, the example identity manager 600 implements the functionality of a credential manager (e.g., such as the credential manager 300 of FIG. 3) to allow credential information to be included in RRs of RR groups 200 to be stored in a name server (e.g., such as the name server 170 as shown). Thus, the example identity manager 600 includes the credential manager 300 which is described in greater detail above in connection with FIG. 3. The identity manager 600 also provides additional functionality to support identity and role management, including any or all of: identity publishing, identity updating, key replacement, identity invalidation, identity obfuscation and/or role management. To implement such functionality, the example identity manager 600 includes an identity publisher 610, an identity updater 620, a key replacer 630, an identity invalidator 640, an identity obfuscator 650 and a role manager 660.

Figure 11:
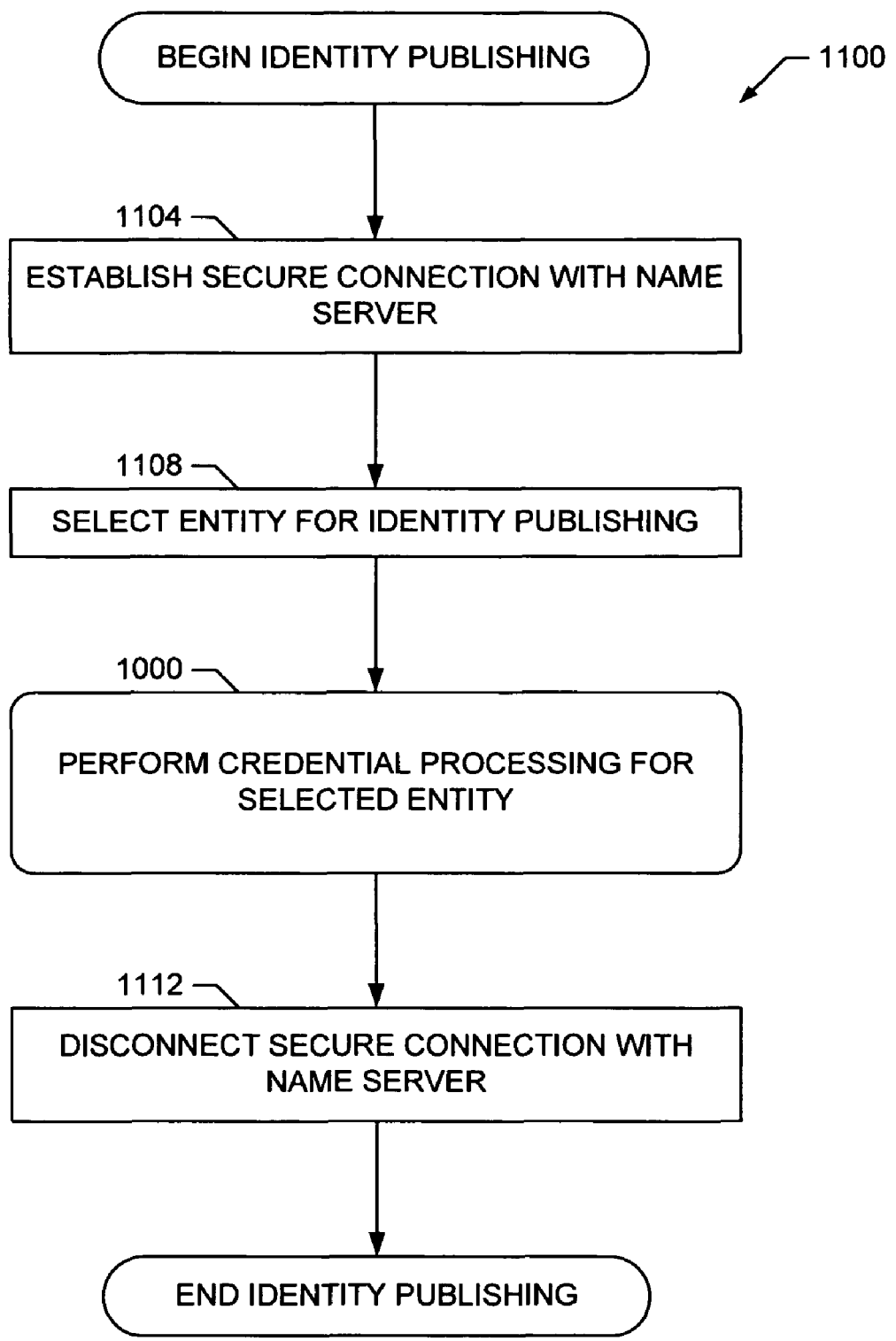
FIG. 11 is a flowchart representative of example machine readable instructions that may be executed to implement the example identity publisher of FIG. 6.

The identity publisher 610 is configured to publish an identity for an entity (e.g., a network user or network domain) in the name server 170. For example, the identity publisher 610 may establish a secure connection to the name server 170 using any standard authentication mechanism (e.g., such as a network login, certificate presentation, LDAP lookup, etc.). Next, the identity publisher 610 creates a public/private key pair. The private key is provided to an entity (e.g., network user) and will be known only by the entity for which the identity is being published. The public key is stored in a KEY RR 210 in the name server along with any role information stored in zero or more ROLE RRs 220-230. Because the identity publisher 610 has already authenticated to the name server 170 in order to establish the secure connection, the name server 170 knows that the identity publisher 610 is publishing only valid credential information. After these RRs are created, signatures over the KEY RR 210 and ROLE RRs 220-230 are generated by the credential manager 300 and stored in SIG RRs 240-250 as discussed above. Example machine readable instructions 1100 that may be used to implement the example identity publisher 610 are illustrated in FIG. 11 and described in greater detail below.

The identity updater 620 is configured to update an entity's identity information already stored in the name server 170. For example, the identity updater 620 may be configured to replace existing identity information associated with a particular entity (e.g., network user or network domain) with new identity information. In this way, the name server 170 will simply provide the appropriate new identity information the next time an authenticator queries the name server 170 for the credential information associated with the particular entity. In the case of the Internet's DNS system employing DNS caching mechanisms, a person of ordinary skill in the art will appreciate that the time to life (TTL) fields on DNS RRs should be configured to a short duration to support efficient identity (and credential) updating (e.g., such as less than five minutes). However, it is possible that the DNS systems of some Internet service providers (ISPs) may be configured to override the designated TTL value to a longer duration. In such circumstances, it may be necessary to set the TTL to 0 to indicate that the DNS servers should not cache the DNS RRs retrieved upon an authentication request.

Figure 12:
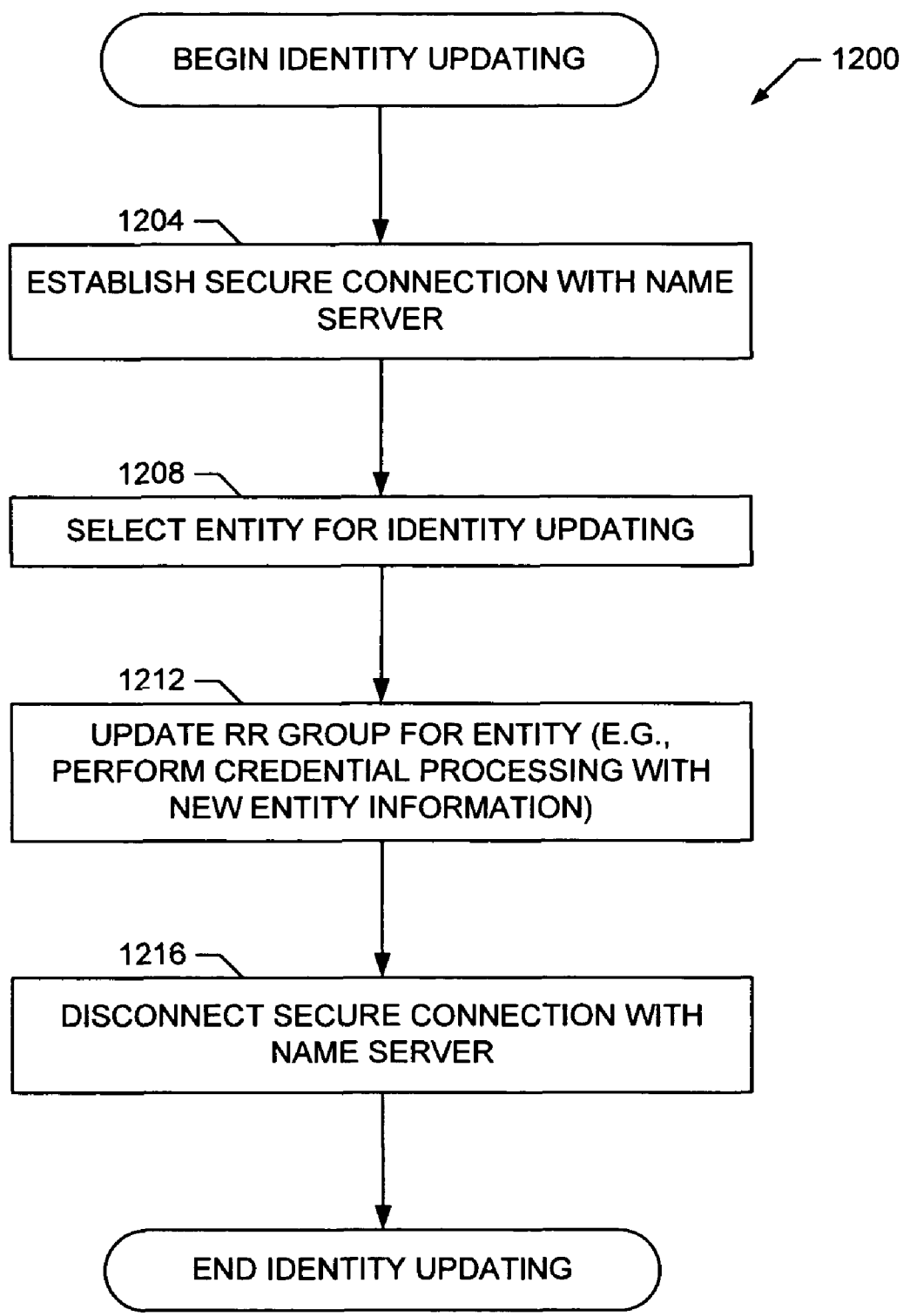
FIG. 12 is a flowchart representative of example machine readable instructions that may be executed to implement the example identity updater of FIG. 6.

A person of ordinary skill in the art will recognize that the updating scheme implemented by the identity updater 620 supports efficient and timely distribution of new public keys. Thus, the identity and role management system 100 does not require a complex revocation scheme for a compromised key. Instead the compromised public key may simply be updated and replaced with a new, different key within, for example, a few minutes (e.g., based on the configured TTL in a DNS system). Example machine readable instructions 1200 which that be used to implement the example identity updater 620 are illustrated in FIG. 12 and described in greater detail below.

Figure 13:
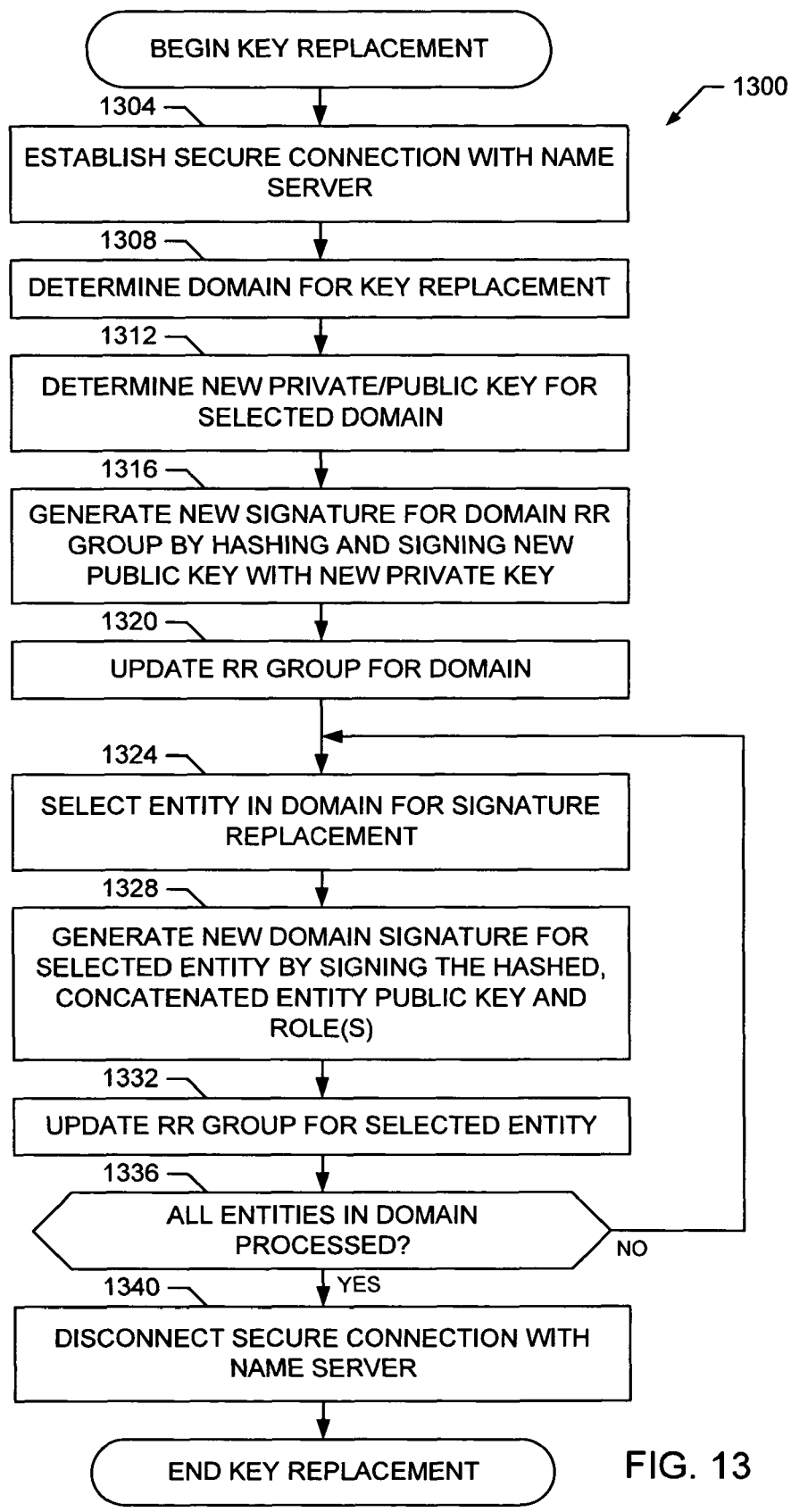
FIG. 13 is a flowchart representative of example machine readable instructions that may be executed to implement the example key replacer of FIG. 6.

The key replacer 630 is configured, for example, to replace domain-signed signatures included in RR groups 200 associated with entities which belong to a particular domain. For example, when a particular domain's private/public key pair is replaced, all signatures signed by the old private key become void. Thus, the key replacer 630 is configured to create new domain-signed signatures to replace the invalidated signatures and store the new domain-signed signatures in the appropriate SIG RRs 240-250 of the affected entities. A person of ordinary skill in the art will note that it is typically necessary to recreate the signatures of only the direct children of the affected domain. Example machine readable instructions 1300 that may be used to implement the example key replacer 630 are illustrated in FIG. 13 and described in greater detail below.

Figure 14:
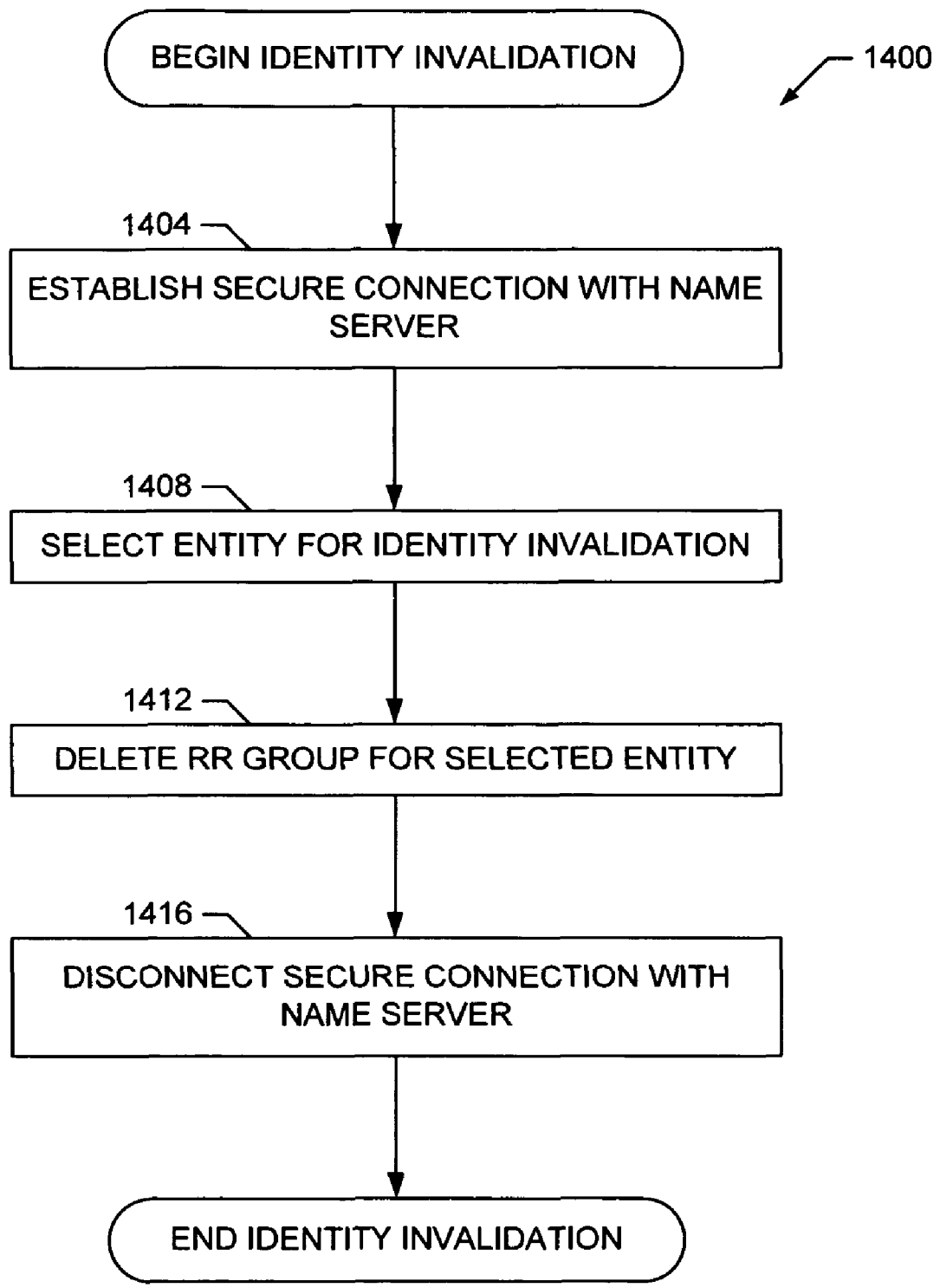
FIG. 14 is a flowchart representative of example machine readable instructions that may be executed to implement the example identity invalidator of FIG. 6.

The identity invalidator 640 is configured to invalidate the identity information of an entity (e.g., network user or network domain), for example, when the entity no longer can validly access the identity and role management system 100. For example, identity invalidation may be appropriate when an employee leaves a company whose network site is configured to be part of the identity and role management system 100. To invalidate an entity's identity, the identity invalidator 640 may simply remove the appropriate RRs from the name server 170. Using the Internet's DNS system as an example, the short duration caching scheme described above in connection with identity updating will cause the affected entity's identity information to be removed from any DNS caches within, for example, a matter of minutes (e.g., based on the configured TTL). If an authenticator subsequently attempts communication with the invalidated entity, a DNS lookup for the entity will fail, indicating to the authenticator that the entity is no longer available. Example machine readable instructions 1400 that may be used to implement the example identity invalidator 640 are illustrated in FIG. 14 and described in greater detail below.

The identity obfuscator 650 is configured to obfuscate an identity associated with an entity to, for example, combat identity harvesters. The identity obfuscator 650 may, for example, encode an entity's identity using any known hashing scheme, such as the MD-2, MD-4 and MD-5 algorithms and the SHS family of algorithms incorporated by reference above. After encoding the identity using the hashing algorithm, the identity obfuscator 650 may be configured to publish additional identity information (e.g., credential information) under this obfuscated identity. For example, a network user named Bob Smith might have an identity of Bob.Smith@foo.com. To publish Bob Smith's identity information (e.g., credential information) the identity obfuscator 650 may encode the string "Bob.Smith" into the string "A390B23F" using the hashing algorithm. The identity obfuscator 650 would then publish Bob Smith's identity information under the identity A390B23F@foo.com.

Figure 15:
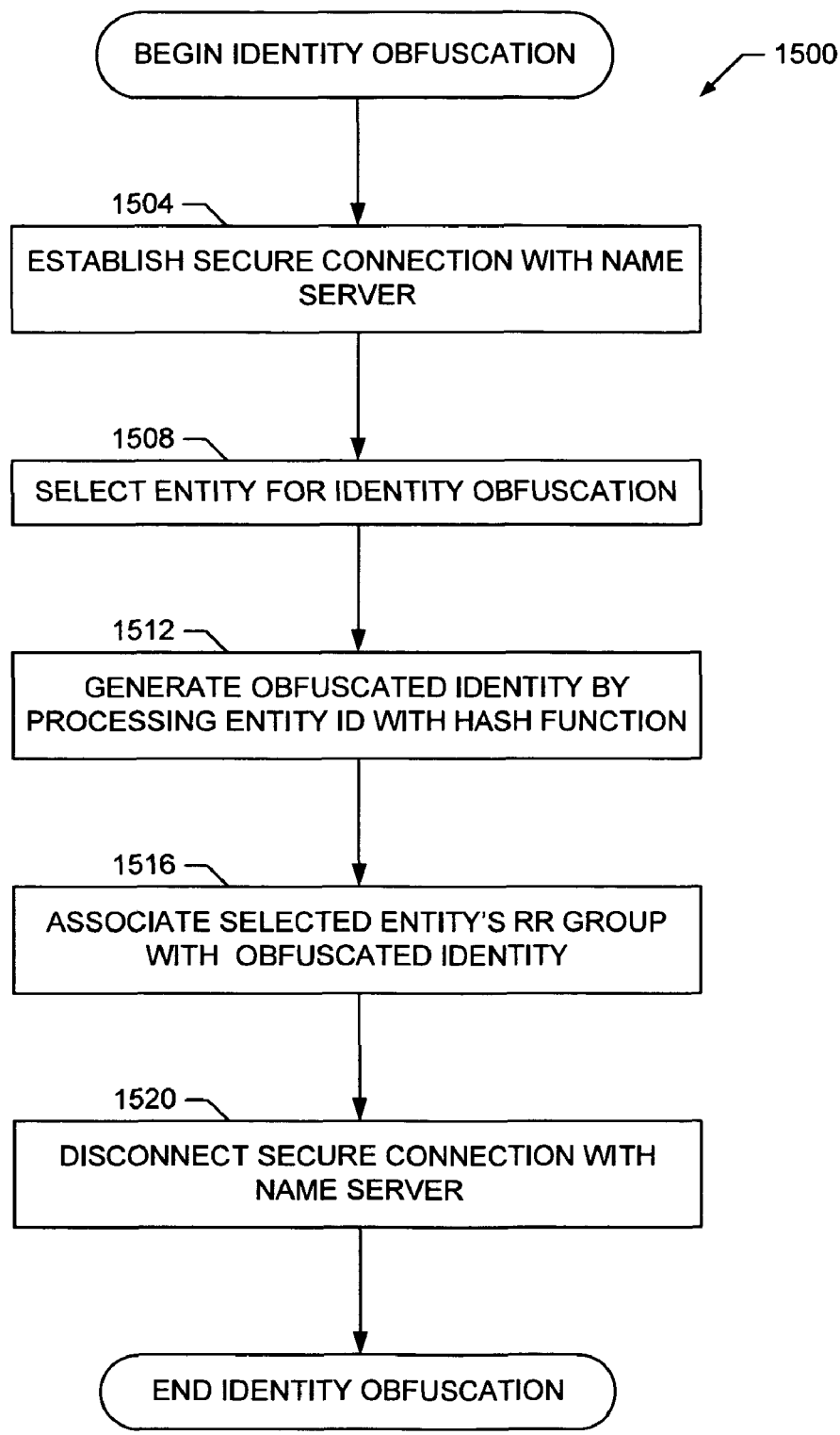
FIG. 15 is a flowchart representative of example machine readable instructions that may be executed to implement the example identity obfuscator of FIG. 6.

An authorized authenticator wishing to communicate with Bob Smith may reproduce the hashed version of his identity and perform an authentication query (e.g., a DNS lookup) using the corresponding obfuscated identity A390B23F@foo.com. However, a malicious user is unable to determine the obfuscated identity and request Bob Smith's identity information without expending extra effort. Further, the malicious user is unable to harvest a list of valid user identities from the name server 170 without significant effort. Thus, although the identity obfuscator 650 does not ensure complete privacy, it does make it more difficult for a malicious user to gain access to an entity's identity information. Example machine readable instructions 1500 that may be used to implement the example identity obfuscator 650 are illustrated in FIG. 15 and described in greater detail below.

The role manager 660 is configured to manage roles associated with the network entities served by the name server 170. Roles published in the name server 170 are available to any interested authenticator because any authenticator can perform an authentication query (e.g., a DNS lookup) to retrieve the ROLE RRs 220-230 associated with an entity. ROLE RRs 220-230 may be stored with the same addressing information as the KEY RRs 210 and the SIG RRs 240-250 and, thus, may be automatically returned to a requesting authenticator.

Generic roles may be used for obscuring or distributing work among a group of users. In the identity and role management system 100, the role manager 660 may assign generic roles to users for this purpose. For example, the entity having identity webmaster@foo.com may have a role of system administrator and communications to this identity can be distributed among a group of entities also having roles of system administrators as appropriate.

In some circumstances, it may be necessary to protect role information for certain entities (e.g., network users) within a network site (e.g., a network site corresponding to a particular company). In such circumstances, the role manager 660 may associate a keyword with the affected role, such as, for example, the keyword "private." Then, an alternative role server (e.g., such as an LDAP server not shown) may be referenced in the appropriate ROLE RR 220-230. An authenticator authorized to retrieve this role information must be pre-configured (i.e., apriori) to communicate with the alternative role server to retrieve the protected role information for this particular entity.

Figure 16:
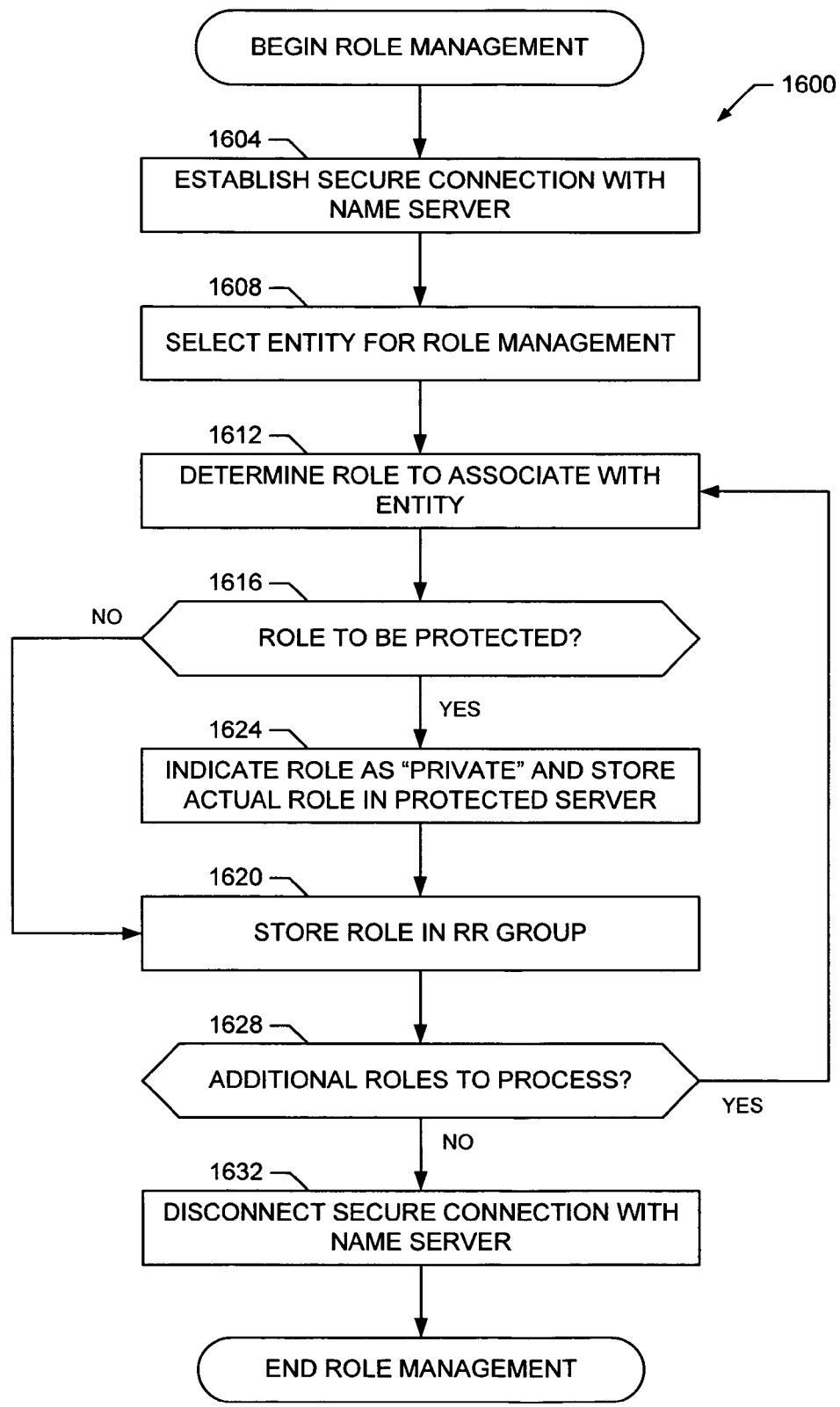
FIG. 16 is a flowchart representative of example machine readable instructions that may be executed to implement the example role manager of FIG. 6.

Some network users may have roles in multiple organizations, such as, for example, a board position within a trading community and employment with a member of that community. When communicating with the user in the context of an employee, it may be unnecessary to display the role of that user within the community, and vice versa. To maintain a proper division of these roles, the user may have separate verifiable identities in separate domains that are served by separate name servers (e.g., such as name servers 160 and 170). Thus, for example, Bob Smith might be identified as bob.smith@foo.com in the domain foo.com and have a role of employee, whereas Bob Smith may also be identified as bob.smith@bar.com in the domain bar.com and have a role of secretary in that community. In this way, Bob Smith could identify himself for authentication by either identity depending on the proper role for the actions intended. Example machine readable instructions 1600 that may be used to implement the example the role manager 660 are illustrated in FIG. 16 and described in greater detail below.

Flowcharts representative of example machine readable instructions that may be executed to implement the credential manager 300 of FIG. 3, the credential manager 400 of FIG. 4, the authentication processor 500 of FIG. 5, the identity publisher 610, the identity updater 620, the key replacer 630, the identity invalidator 640, the identity obfuscator 650 and the role manager 660 of FIG. 6 are shown in FIGS. 7, 8A-B and 10-16. In these examples, the machine readable instructions represented by each flowchart may comprise one or more programs for execution by: (a) a processor, such as the processor 1812 shown in the example computer 1800 discussed below in connection with FIG. 18, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1812, but persons of ordinary skill in the art will readily appreciate that the entire program or programs and/or portions thereof could alternatively be executed by a device other than the processor 1812 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the credential manager 300, the credential manager 400, the authentication processor 500, the identity publisher 610, the identity updater 620, the key replacer 630, the identity invalidator 640, the identity obfuscator 650 and/or the role manager 660 could be implemented by any combination of software, hardware, and/or firmware. Also, some or all of the machine readable instructions represented by the flowchart of FIGS. 7, 8A-B and 10-16 may be implemented manually. Further, although the example machine readable instructions are described with reference to the flowcharts illustrated in FIGS. 7, 8A-B and 10-16, persons of ordinary skill in the art will readily appreciate that many other techniques for implementing the example methods and apparatus described herein may alternatively be used. For example, with reference to the flowcharts illustrated in FIGS. 7, 8A-B and 10-16, the order of execution of the blocks may be changed, and/or some of the blocks described may be changed, eliminated, combined and/or subdivided into multiple blocks.

Figure 7:
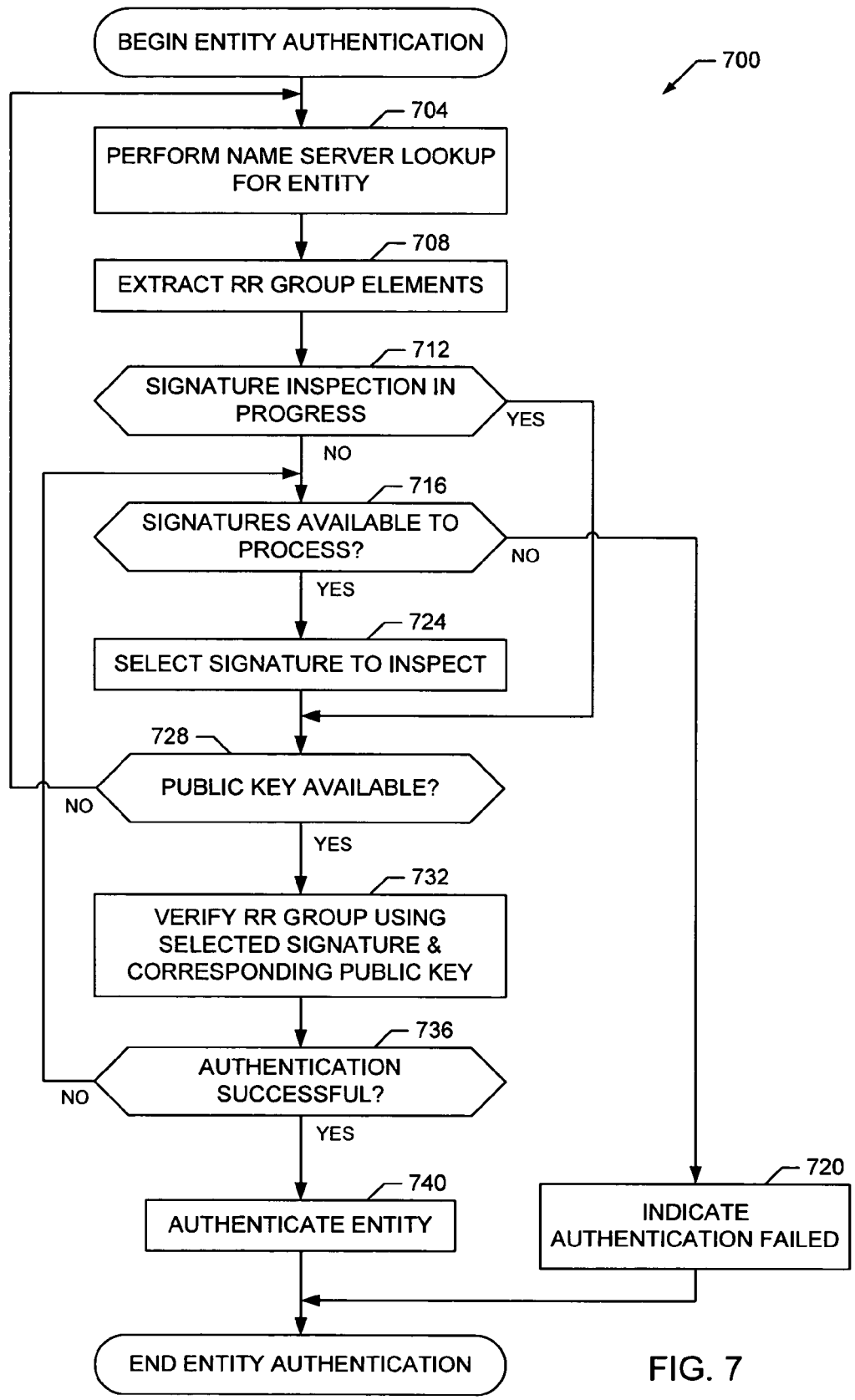
FIG. 7 is a flowchart representative of first example machine readable instructions that may be executed to implement the example authentication processor of FIG. 5.

Example machine readable instructions 700 that may be executed to implement the authentication processor 500 of FIG. 5 are shown in FIG. 7. The example machine readable instructions 700 operate to authenticate the identity and role of an entity in, for example, the identity and role management system 100 of FIG. 1. The example machine readable instructions 700 may be executed, for example, each time an authenticator attempts to authenticate an entity (e.g., a network user or network domain) to, for example, initiate a communication between the authenticator and the entity, update the credential information associated with the entity for caching at the authenticator's network site, etc.

Referring to the example authentication processor 500 of FIG. 5, the machine readable instructions 700 begin execution at block 704 at which the RR group retriever 510 of the authentication processor 500 initiates an authentication request (e.g., a DNS lookup) to be processed by a name server (e.g., such as the name server 160 of FIG. 1) serving a particular entity to be authenticated. For example, in the case of the name server 160 being a domain name server that is part of the Internet's DNS, the DNS lookup initiated by the RR group retriever 510 may be routed through the DNS until it reaches the appropriate name server 160. After processing the authentication request, the name server 160 returns an RR group 200 associated with the entity to be authenticated to the RR group retriever 510. The RR group 200 returned by the name server 160 may be one of many RR groups 200 associated with the entity.

Next, control proceeds to block 708 at which the RR group parser 530 of the authentication processor 500 parses and extracts the KEY RR 210, the zero or more ROLE RRs 220-230 and any SIG RRs 240-250 included in the RR group 200 retrieved as a result of processing at block 704. Next, control proceeds to block 712 at which the authentication processor 500 determines whether a particular signature included in one of the SIG RRs 240-250 is already being inspected to verify the contents of the RR group 200 and thereby authenticate the associated entity. Signature inspection may already be in progress at block 712 if, for example, the present RR group 200 retrieved at block 704 corresponds to a signer whose public key is needed to verify a signature included in another RR group 200 previously retrieved through processing at block 704. If no signature inspection is in progress (block 712), control proceeds to block 716 at which the authentication processor 500 determines whether any signatures are available in the SIG RRs 240-250 associated with the entity to be authenticated. The machine readable instructions 700 support processing multiple signatures included in an RR group 200. Thus, at block 716, the authentication processor 500 determines whether no signatures were returned in the RR group 200 retrieved at block 704 or whether all signatures that were returned have already been processed (and, thus, verification of all signatures have failed). If there are no signatures available to process (block 716), control proceeds to block 720 at which the authentication processor 500 indicates that authentication of the associated entity has failed. Execution of the example machine readable instructions 700 then ends.

However, if there are signatures available to process (block 716), control then proceeds to block 724 at which the authentication processor 500 selects a particular signature included in the SIG RRs 240-250 to inspect and use to verify the contents of the RR group 200. For example, the authentication processor 500 may select a self-signed signature if only verification of the integrity of the contents of the RR group 200 is required. As another example, the authentication processor 500 may select a domain-signed signature or a community-signed signature instead if authentication of the entity as a member of a particular domain or community is required. In any case, after selecting the signature to process or inspect (block 724) or if a signature is already being inspected by the authentication processor 500 (block 712), control proceeds to block 728 at which the authentication processor 500 determines whether the public key corresponding to the signer associated with the signature under inspection is available. For example, in the case of a self-signed signature, the signer's public key is available because it is included in the KEY RR 210 of the RR group 200 of the entity being authenticated. In the case of domain-signed or community-signed signatures, the required signer's public key may also be available if, for example, the authentication processor 500 already retrieved and cached this public key as part of a prior authentication procedure. If the required signer's public key is available (block 728), control proceeds to block 732. However, if the required public key is not available (block 728), control returns to block 704 and blocks subsequent thereto at which the RR group retriever 510 initiates an authentication request to retrieve the RR group 200 associated with the required signer to obtain the signer's public key from the corresponding KEY RR 210.

Assuming that the required signer's public key is available (block 728), control proceeds to block 732 at which the authentication processor 500 verifies the RR group 200 using the signature selected at block 724 and the corresponding signer's public key. As discussed previously in connection with FIG. 5, at block 732 the authentication processor 500 processes the extracted information included in the KEY RR 210 and zero or more ROLE RRs 220-230 with the concatenation processor 310 and the hash processor 320 to obtain a hash output. The hash output is then compared by the comparator 550 with the decryption output obtained by decrypting the signature with the decryption processor 540 based on the signer's public key. Control then proceeds to block 736 at which the comparator 550 of the authentication processor 500 determines whether authentication of the RR group 200 was successful by determining whether the hash output and the decryption output determined at block 732 are substantially equivalent (e.g., whether the hash output and the decryption output match). If the hash output and the decryption output are not substantially equivalent (e.g., do not match) (block 736), control returns to block 716 and blocks subsequent thereto (e.g., according to the policies enforced by the policy manager 570) at which the authentication processor 500 determines whether other signatures are available to verify the RR group 200. However, if the hash output and the decryption output are substantially equivalent (e.g., do match) (block 736), control proceeds to block 740 at which the comparator 550 indicates that authentication of the entity associated with the verified RR group 200 was successful. Execution of the example machine readable instructions 700 then ends.

Persons of ordinary skill in the art will appreciate that, even in the face of an authentication failure at block 720, the authentication processor 500 may still authorize use of the information included in the RR group 200 (possibly with restrictions) according to the policies enforced by the policy manager 570. Additionally or alternatively, in the event of an authentication failure and if multiple RR groups 200 are associated with the network entity being authenticated, the policy manager 570 may cause execution of the example machine readable instructions 700 again to attempt to authenticate the entity based on another associated RR group 200.

Figure 8A:
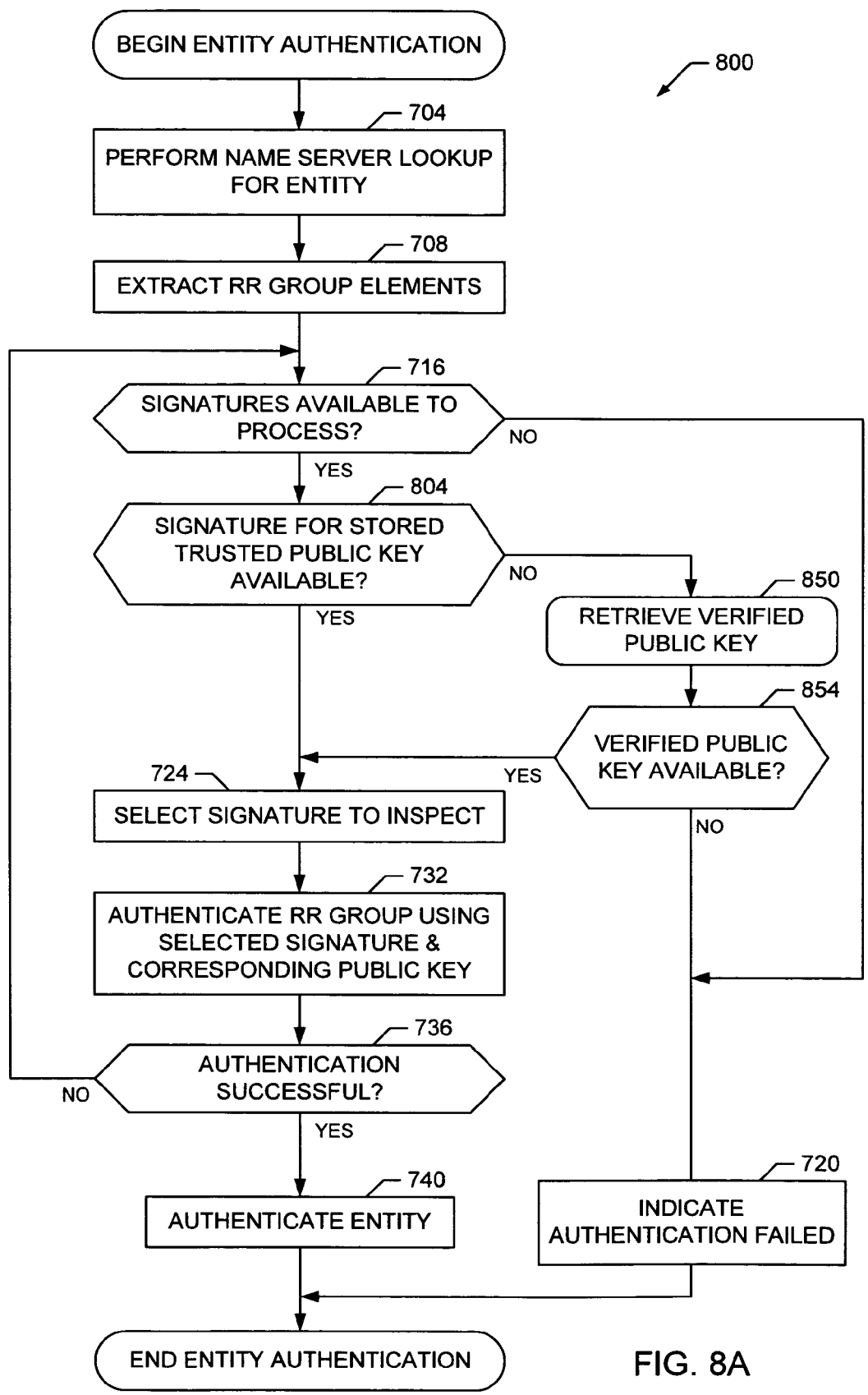
FIGS. 8A-8B collectively form a flowchart representative of second example machine readable instructions that may be executed to implement the example authentication processor of FIG. 5.
Figure 8B:
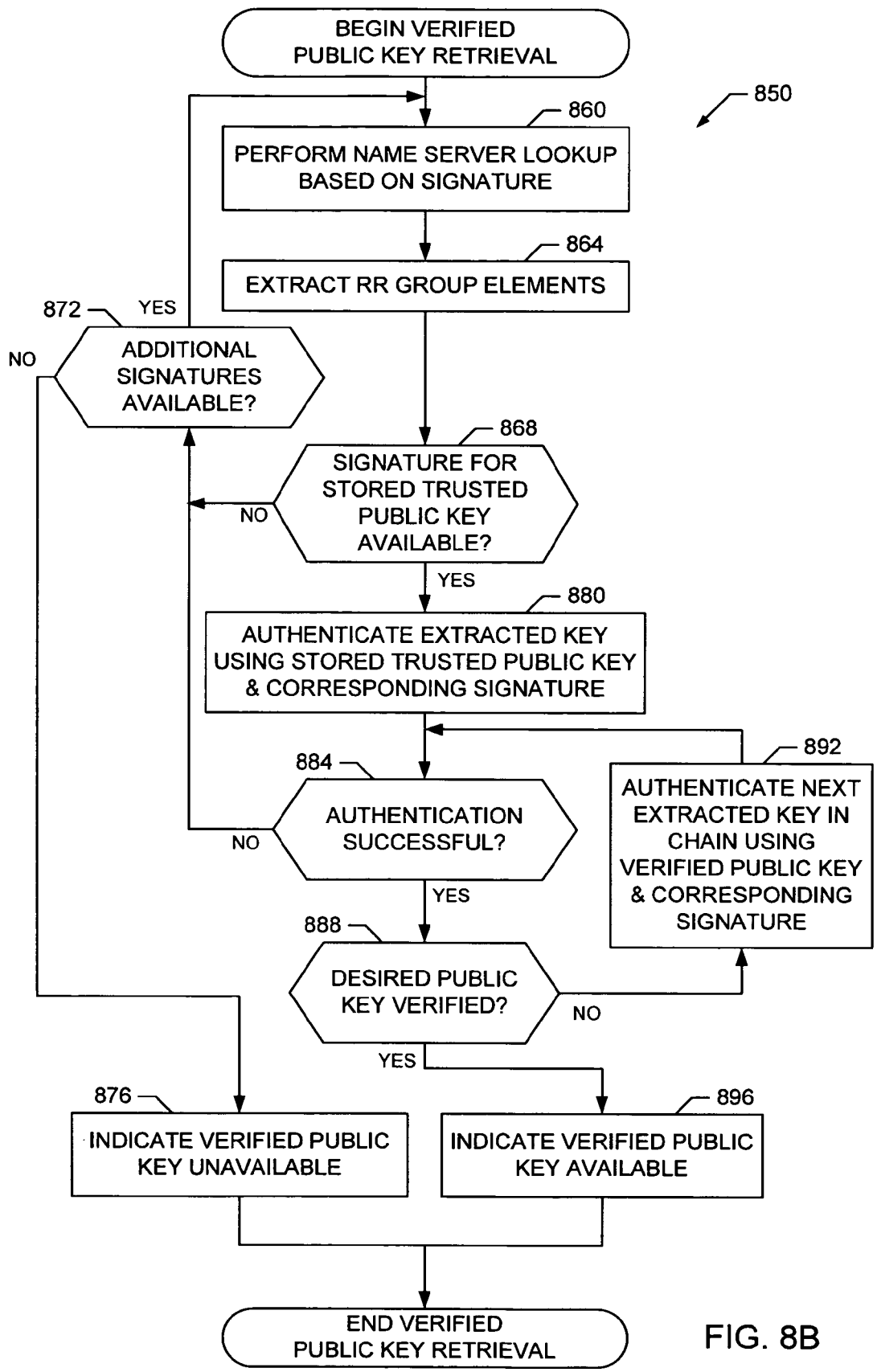

Second example machine readable instructions 800 that may also be executed to implement the authentication processor 500 of FIG. 5 are shown in FIGS. 8A-8B. The example machine readable instructions 800 also operate to authenticate the identity and role of an entity in, for example, the identity and role management system 100 of FIG. 1. The example machine readable instructions 800 may be executed, for example, each time an authenticator attempts to authenticate an entity (e.g., a network user or network domain) to, for example, initiate a communication between the authenticator and entity, update the credential information associated with the entity for caching at the authenticator's network site, etc.

The example machine readable instructions 800 perform similar processing as the example machine readable instructions 700 of FIG. 7. Therefore, blocks having similar functionality in both the machine readable instructions 700 and 800 are labeled with the same numeric identifiers. The reader is invited to refer to the discussion of FIG. 7 provided above for a description of these blocks. Additionally, the machine readable instructions 800 further implement a particular procedure for selecting a signature and obtaining the signer's public key to verify the authenticity of an entity. The following discussion of FIG. 8 focuses on the description of the blocks that implement this additional functionality associated with selecting the signature for inspection and obtaining the signer's public key.

Turning to FIG. 8A, and referring to the example authentication processor 500 of FIG. 5, the example machine readable instructions 800 begin execution at block 704 and execution proceeds through block 716 as discussed above in connection with FIG. 7, although the decision processing at block 712 is no longer implemented by the machine readable instructions 800. Next, if signatures are available in the SIG RRs 240-250 extracted from the RR group 200 retrieved at block 704, control proceeds to block 804 at which the authentication processor initially determines whether a trusted signer's public key corresponding to one of the signatures included in the SIG RRs 240-250 is already available. For example, and as mentioned previously, a trusted signer's public key may already be available if the authentication processor 500 previously retrieved and cached this public key as part of a prior authentication procedure. If a trusted public key is available and the SIG RRs 240-250 include a signature corresponding to this trusted key (block 804), control proceeds to block 724 and blocks subsequent thereto at which the authentication processor 500 selects the signature corresponding to the trusted public key for verification of the RR group 200 as discussed above in connection with FIG. 7. However, if a trusted public key is not already available, or a signature corresponding to an available trusted public key is not included in the SIG RRs 240-240 (block 804), the authentication processor 500 proceeds to execute the machine readable instructions 850 as shown.

The authentication processor 500 executes the machine readable instructions 850 to retrieve a verified signer's public key corresponding to a signature included in the SIG RRs 240-250. An example set of machine readable instructions 850 are illustrated in FIG. 8B discussed below. After execution of the machine readable instructions 850 completes, control proceeds to block 854 at which the authentication processor 500 determines whether a verified signer's public key corresponding to a signature included in the SIG RRs 240-250 is now available. If a verified signer's public key is not available (block 854), control proceeds to block 720 at which the authentication processor 500 indicates that authentication of the associated entity has failed. Execution of the example machine readable instructions 800 then ends. However, if a verified signer's public key is available (block 854), control proceeds to block 724 and blocks subsequent thereto at which the authentication processor 500 selects the signature corresponding to the verified public key for verification of the RR group 200 as discussed above in connection with FIG. 7. Execution of the example machine readable instructions 800 then ends.

FIG. 8B illustrates example machine readable instructions 850 that may be executed by the authentication processor 500 to retrieve a verified signer's public key corresponding to a signature included in the SIG RRs 240-250 associated with an entity to be authenticated. The machine readable instructions 850 begin execution at block 860 at which the RR group retriever 510 of the authentication processor 500 initiates an authentication request (e.g., a DNS lookup) to be processed by a name server (e.g., such as the name server 160 of FIG. 1) serving a signer whose identity information is included in a selected SIG RR 240-250 associated with an entity being authenticated. For example, in the case of the name servers being domain name servers that are part of the Internet's DNS, the DNS lookup initiated by the RR group retriever 510 may be routed through the DNS until it reaches the appropriate name server 160. After processing the authentication request, the name server 160 returns an RR group 200 associated with the requested signer to the RR group retriever 510.

Figure 9:
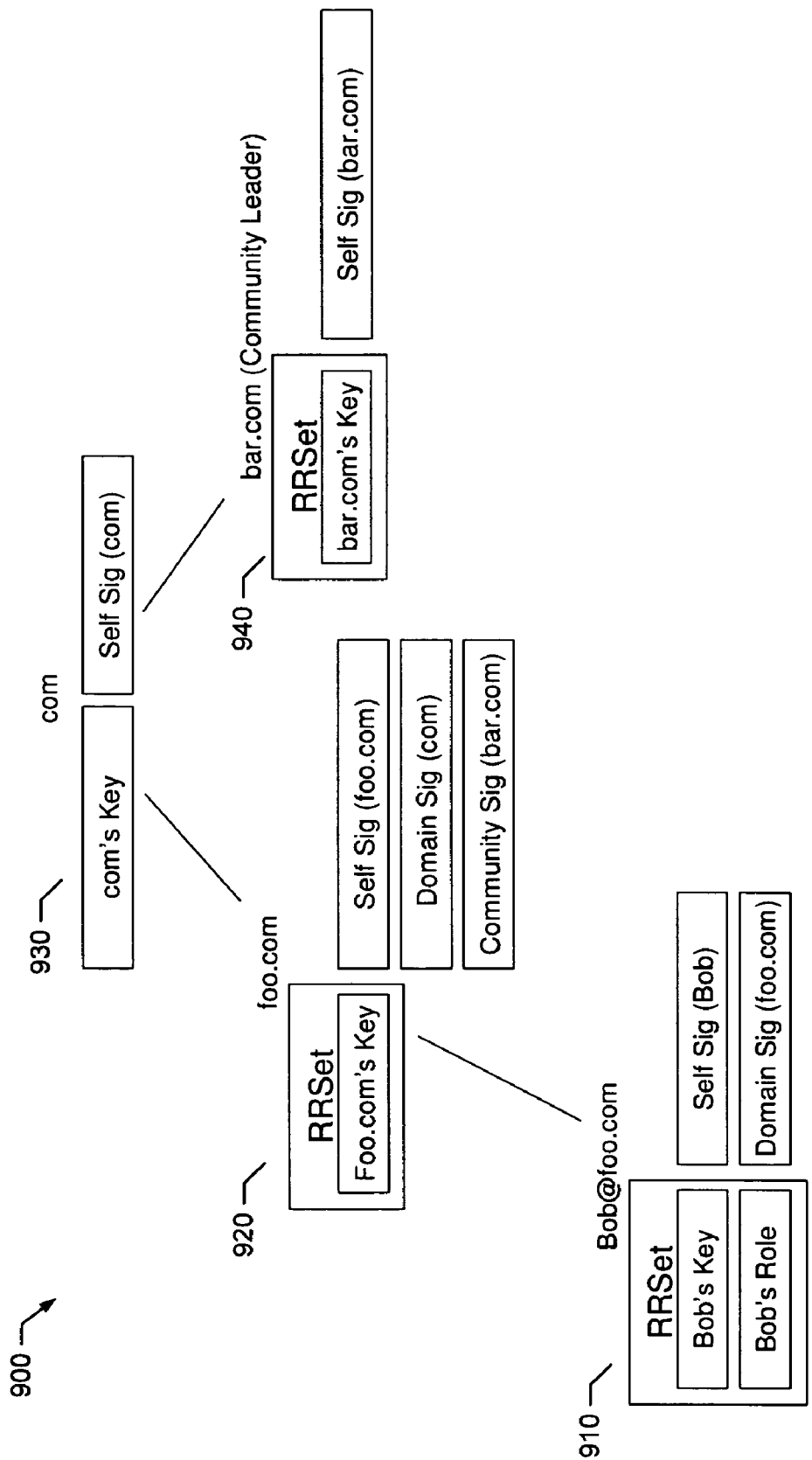
FIG. 9 illustrates an example operation of the example authentication processor of FIG. 5.

To better understand the processing performed at block 860, consider the example authentication scenario 900 illustrated in FIG. 9. In the example authentication scenario, the authentication processor 500 operates to authenticate the entity Bob and executes, for example, the machine readable instructions 800 to retrieve and parse Bob's RR group 910 based on the identity Bob@foo.com. The authentication processor 500 then determines that the domain signed signature corresponding to the signer foo.com is the only signature available in the RR group 910 to authenticate Bob (recall that a self signed signature may be used to verify the integrity of the RR group 910 but not its authenticity). Assuming that the trusted public key associated with foo.com is not available, the authentication processor 500 may execute the machine readable instruction 850 which, at block 860, will retrieve the RR group 920 associated with the signer foo.com.

Returning to FIG. 8B, control next proceeds to block 864 at which the RR group parser 530 of the authentication processor 500 parses and extracts the KEY RR 210, the zero of more ROLE RRs 220-230 and any SIG RRs 240-250 included in the signer's RR group 200 retrieved as a result of processing at block 860. Next, control proceeds to block 868 at which the authentication processor 500 determines whether a trusted public key is already available which corresponds to one of the signatures included in the signer's SIG RRs 240-250 parsed at block 864. For example, returning to the scenario 900 of FIG. 9, the authentication processor 500 at block 864 would determine whether trusted public keys corresponding to the domain signature signer com or the community signature signer bar.com are available.

Returning to FIG. 8B, if a trusted public key is not available (block 868), control proceeds to block 872 at which the authentication processor 500 determines whether the signer's SIG RRs 240-250 include additional signatures which may be used to verify the signer's public key (e.g., such as the domain signed signature corresponding to the signer com and the community signed signature associated with the signer bar.com included in the RR group 920 of FIG. 9). If additional signatures are available (block 872), control returns to block 860 and blocks subsequent thereto at which the authentication processor retrieves the RR group 200 associated with a signer of an available signature (e.g., such as the RR group 930 associated with the signer com or the RR group 940 associated with the signer bar.com in FIG. 9). If no additional signatures are available (block 872), control proceeds to block 876 at which the authentication processor 500 indicates that a verified signer's public key is unavailable because verification was unsuccessful. Execution of the example machine readable instructions 850 then ends.

However, if at block 868 the authentication processor 500 determines that a trusted public key is available to verify a signature contained in the signer's SIG RRs 240-250, control proceeds to block 880. At block 880, the authentication processor 500 verifies the signer's RR group 200 using the signature corresponding to the available trusted public by decrypting the signature and comparing the decryption result to a hash result based on the other RRs included on the signer's RR group 200 as discussed above. For example, returning to the scenario 900 of FIG. 9, if the trusted public key associated with either the signer com or bar.com is available, the authentication processor 500 at block 880 may use this trusted public key to verify the RR group 920 to obtain a verified public key associated with the signer foo.com.

Returning to FIG. 8B, control proceeds to block 884 at which the authentication processor 500 determines whether authentication of the signer's public key was successful. If authentication was unsuccessful (block 884), control returns to block 872 and blocks subsequent thereto at which the authentication processor 500 determines whether additional signatures are available in the signer's SIG RRs 240-250 which may be used to verify the signer's public key. For example, in the scenario 900 of FIG. 9, if authentication of the RR group 920 associated with signer foo.com fails based on the community signed signature corresponding to signer bar.com, the authentication processor 500 may still attempt to authenticate the RR group 920 based on the domain signed signature corresponding to signer com. However, if the authentication was successful (block 884 of FIG. 8B), control proceeds to block 888 at which the authentication processor 500 determines whether the signer's public key verified at block 880 corresponds to the required signer's public key needed to verify the RR group 200 associated with the entity originally being authenticated by the authentication processor 500.

For example, in the scenario 900 of FIG. 9, the authentication processor 500 may not possess trusted public keys associated with either signer com or bar.com. In this case, based on the iterative processing of blocks 860-868 of FIG. 8B described above, the authentication processor 500 would proceed up the domain chain to retrieve the RR group 930 associated with the root signer com and verify the integrity of com's public key based on the included self signed signature associated with com. Assuming this self-authentication is successful, then at blocks 884-888 of FIG. 8B the authentication processor 500 would determine that verification of a signer's public key was successful, but this verified public key does not correspond to the signer foo.com required to verify the RR group 910 associated with the original entity Bob being authenticated. Therefore, returning to FIG. 8B, if the authentication processor 500 determines that the verified public key does not correspond to the required signer (block 888), control proceeds to block 892 at which the authentication processor 500 then authenticates the public key associated with the next signer in the chain retrieved by the iterative processing of blocks 860-868. Control then returns to block 884 at which the authentication processor 500 determines whether authentication of this next signer's public key was successful.

For example, in the scenario 900 of FIG. 9, after verifying the public key associated with the signer com, the authentication processor 500 at block 892 would use this verified public key to authenticate the RR group 910 associated with foo.com based on the included domain signed signature. Returning to FIG. 8B, if the authentication processor 500 determines that the verified public key corresponds to the required signer (block 888), control proceeds to block 896 at which the authentication processor 500 indicates that the verified signer's public key required to verify the RR group 200 associated with the entity being authenticated is available. The example machine readable instructions 850 then end.

Considering the example authentication scenario 900 of FIG. 9, a person of ordinary skill in the art will recognize that the example machine readable instructions 800 and 850 of FIGS. 8A-8B enable the authentication processor 500 to support a flexible authentication scheme. For example, an authenticator attempting to verify the entity (e.g., user) Bob having identity Bob@foo.com has the choice of considering Bob's self signature in the RR group 910 to be sufficient. Alternatively, if the authenticator requires verification of Bob's public key based on Bob's domain, authentication may be based on the domain signed signature included in the RR group 910.

Additionally or alternatively, if the authenticator wishes to verify whether Bob is a member of the community bar.com, such verification can be accomplished by verifying a community signed signature included in the RR group 910. However, in the example scenario 900, Bob's RR group 910 does not include a community signature. However, the authenticator may still verify Bob's membership of the community. For example, Bob's domain, foo.com, includes a community signature in its RR group 920. Therefore, because Bob's RR group 910 already includes a domain signature corresponding to foo.com, the authenticator has an authentication chain to validate Bob's identity and membership in the community bar.com.

Based on this example, a person of ordinary skill in the art will appreciate the flexibility of this authentication scheme. Furthermore, the authenticator alone is responsible for determining which scheme will satisfactorily authenticate an entity (e.g., Bob). This configurability and flexibility to implement the authentication scheme is entirely the province of the authenticator and requires no special arrangements with the entities to be authenticated.

Figure 10:
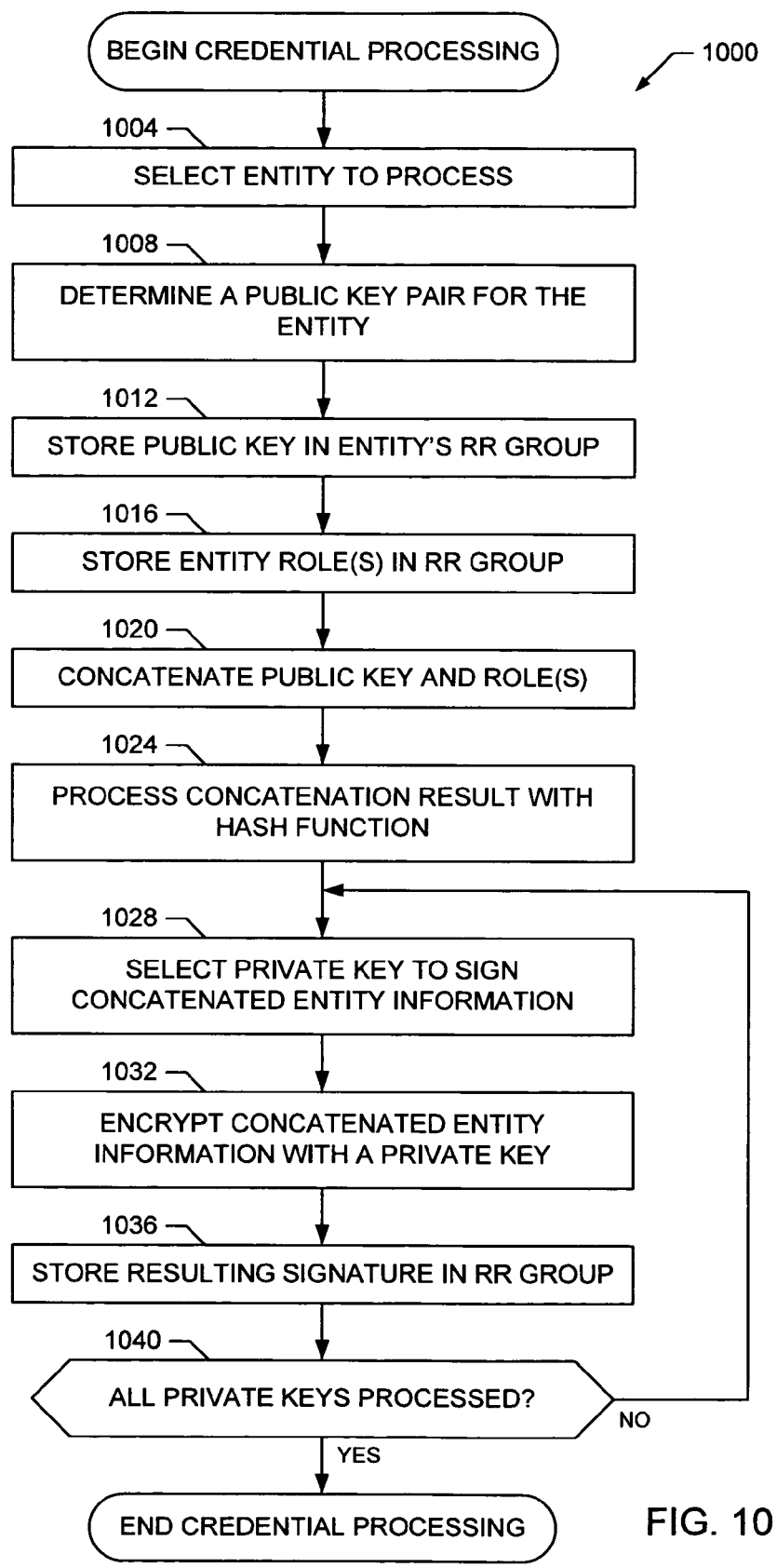
FIG. 10 is a flowchart representative of example machine readable instructions that may be executed to implement the example credential manager of FIG. 3 and/or FIG. 4.

Example machine readable instructions 1000 that may be executed to implement the credential manager 300 of FIG. 3 (and/or at least portions of the credential manager 400 of FIG. 4) are shown in FIG. 10. The example machine readable instructions 1000 operate to determine and make available credential information associated with an entity in, for example, the identity and role management system 100 of FIG. 1. The example machine readable instructions 1000 may be executed, for example, each time an entity generates credential information, publishes credential information, updates credential information, etc.

Referring to the example credential manager 300 of FIG. 3, the machine readable instructions 1000 begin execution at block 1004 at which the credential manager 300 selects a particular entity (e.g., network user or network domain) for which credential information is to be processed for inclusion in the selected entity's RR group 200. Control then proceeds to block 1008 at which the credential manager 300 determines the public key to be contained in the KEY RR 210 of the entity's RR group 200. For example, at block 1008 the credential manager 300 may determine the public key locally as part of a public/private key pair to be assigned to the entity. Additionally or alternatively, the credential manager 300 may be configured to receive the entity's public key from an external source responsible for key generation and allocation. In any case, after determining the entity's public key at block 1008, control proceeds to block 1012 at which the credential manager 300 stores the public key in the KEY RR 210 included in the entity's RR group 200. Additionally, the credential manager 300 may be configured to store information in the KEY RR 210 indicating the type of public key encryption algorithm associated with included public key. Example public key encryption algorithms that may be supported include DSA and RSA/MD5 specified in Internet RFCs 2536 and 2537, respectively, incorporated by reference above.

Next, control proceeds to block 1016 at which the credential manager 300 stores any role information in the ROLE RRs 220-230 of the RR group 200 associated with the entity selected at block 1004. As discussed above, the entity may be associated with zero, one, or more roles, and a role can exist, for example, local to an organization/domain, or may be community wide. The credential manager 300 may be configured to receive any roles to associate with the selected entity from, for example, an external source, such as the role manager 660 of FIG. 6 discussed above. After storing any role information at block 1016, control proceeds to block 1020 at which the concatenation processor 310 of the concatenation manager 300 concatenates all or some of the information contained in the KEY RR 210 and the ROLE RRs 220-230 to begin determination of one or more signatures used to sign the KEY RR 210 and the ROLE RRs 220-230. As discussed above, the concatenation result produced at block 1020 by the concatenation processor 310 may have variable length.

Control then proceeds to block 1024 at which the hash processor 320 of the credential manager 300 processes the concatenation result produced at block 1020 with a hash function. A hash function is utilized to translate the potentially variable length concatenation result of block 1020 to a fixed length hash result that may be encrypted by a public key encryption algorithm. Examples of possible hash functions that may be implemented at block 1024 include the MD-2, MD-4 and MD-5 algorithms and the SHS family of algorithms incorporated by reference above. Control next proceeds to block 1028 at which the credential manager 300 selects a signer's private key 360 to be used to encrypt the hash result determined at block 1024 and, thereby, sign the RR group 200. For example, in the case of self-signing the RR group 200, the credential manager 300 may be configured to select the private key corresponding to the entity's own public key determined at block 1008 to be the signer's private key 360. As another example, in the case of domain-signing the RR group 200, the credential manager 300 may be configured to select the private key associated with the domain in which the entity belongs to be the signer's private key 360. As yet another example, in the case of community-signing, the credential manager 300 may be configured to select a trusted private key associated with a particular community in which the entity belongs to be the private key 360. In any case, after selection of the signer's private key at block 1028, control proceeds to block 1032.

At block 1032, the encryption processor 330 of the credential manager 300 encrypts the hash result determined at block 1024 based on a public key encryption algorithm using the private key selected at block 1028. Example public key encryption algorithms that may be implemented by the encryption processor 330 at block 1032 include DSA or RSA/MD5 specified in Internet RFCs 2536 and 2537, respectively, incorporated by reference above. Control then proceeds to block 1036 at which the credential manager 300 stores the encryption result produced by the encryption processor 330 at block 1036 as a signature in a SIG RR 240-250 included in the RR group 200 associated with the entity selected at block 1004. Next, control proceeds to block 1040 at which the credential manager 300 determines whether all private keys to be used to sign the RR group 200 have been processed. If there are still private keys remaining to be processed (block 1040), control returns to block 1028 and blocks subsequent thereto at which the credential manager 300 selects another signer's private key to sign the RR group 200. If, however, all private keys have been processed (block 1040), execution of the example machine readable instructions 1000 then ends.

Example machine readable instructions 1100 that may be executed to implement the identity publisher 610 of FIG. 6 are shown in FIG. 11. The example machine readable instructions 1100 operate to publish credential information associated with an entity in, for example, the identity and role management system 100 of FIG. 1. The example machine readable instructions 1100 may be executed, for example, each time an entity's credential information is to be published.

The machine readable instructions 1100 begin execution at block 1104 at which the identity publisher 610 establishes a secure connection with a name server (e.g., such as name server 170) accessible over a communication network (e.g., communication network 110 of FIG. 1) and configured to store and publish credential information for network entities. The credential information may be published as RR groups 200 associated with the entities served by the name server. At block 1104, the identity publisher 610 may be configured to establish the secure connection using any standard authentication mechanism (e.g., such as a network login, certificate presentation, LDAP lookup, etc.). Next, control proceeds to block 1108 at which the identity publisher 610 selects a particular entity (e.g., network user or network domain) for which the RR group 200 containing the credential information is to be published.

After the entity is selected at block 1108, the identity publisher 610 executes the example machine readable instructions 1000 of FIG. 10 to generate and store credential information in the name server as an RR group 200 associated with the selected entity. Example credential information includes a public key contained in the KEY RR 210 associated with the entity, zero or more roles contained in the ROLE RRs 220-230 associated with the entity and one or more signatures contained in the SIG RRs 240-250 that sign some or all of the credential information contained in the KEY RR 210 and ROLE RRs 220-230. After execution of the example instructions 1000 completes, the KEY RR 210, the zero or more ROLE RRs 220-230 and the one or more SIG RRs 2450-250 included in the RR group 200 associated with the entity selected at block 1108 are now published in the name server. Control then proceeds to block 1112 at which the identity publisher 610 disconnects the secure connection with the name server that was established at block 1104. Execution of the example machine readable instructions 1100 then ends.

Example machine readable instructions 1200 that may be executed to implement the identity updater 620 of FIG. 6 are shown in FIG. 12. The example machine readable instructions 1200 operate to update credential information associated with an entity in, for example, the identity and role management system 100 of FIG. 1. The example machine readable instructions 1200 may be executed, for example, each time an entity's credential information is to be updated.

The machine readable instructions 1200 begin execution at block 1204 at which the identity updater 620 establishes a secure connection with a name server (e.g., such as name server 170) accessible over a communication network (e.g., communication network 110 of FIG. 1) and configured to store and publish credential information for network entities. The credential information may be published as RR groups 200 associated with the entities served by the name server. At block 1204, the identity publisher 610 may be configured to establish the secure connection using any standard authentication mechanism (e.g., such as a network login, certificate presentation, LDAP lookup, etc.). Next, control proceeds to block 1208 at which the identity updater 620 selects a particular entity (e.g., network user or network domain) for which the RR group 200 containing the credential information is to be updated.

After the entity is selected at block 1208, control proceeds to block 1212 at which the identity updater 620 updates the RR group 200 for the entity selected at block 1208. For example, at block 1212 the identity updater 620 may be configured to: (1) retrieve the RR group 200 to be updated, (2) determine new information to include in the RR group 200 and (3) overwrite the existing information contained in the RR group 200 with the newly determined information. The identity updater 620 may be configured to execute all or appropriate portions of the example machine readable instructions 1000 of FIG. 10 to generate the new credential information for updating the RR group 200. Example credential information which may be updated includes the public key contained in KEY RR 210 associated with the selected entity, zero or more roles contained in the ROLE RRs 220-230 associated with the selected entity and one or more signatures contained in the SIG RRs 240-250 that sign some or all of the credential information contained in the KEY RR 210 and ROLE RRs 220-230.

After processing at block 1212 completes, the credential information in the RR group 200 associated with the entity selected at block 1208 is now updated in the name server. Control then proceeds to block 1216 at which the identity updater 620 disconnects the secure connection with the name server that was established at block 1204. Execution of the example machine readable instructions 1200 then ends.

Example machine readable instructions 1300 that may be executed to implement the key replacer 630 of FIG. 6 are shown in FIG. 13. The example machine readable instructions 1300 operate to support replacement of a public/private key pair associated with a domain in, for example, the identity and role management system 100 of FIG. 1. The example machine readable instructions 1300 may be executed, for example, each time a domain's public/private key pair is replaced to enable updating of the RR groups 200 associated with descendent entities of the affected domain and that now contain out-of-date domain-signed signatures.

The machine readable instructions 1300 begin execution at block 1304 at which the key replacer 630 establishes a secure connection with a name server (e.g., such as name server 170) accessible over a communication network (e.g., communication network 110 of FIG. 1) and configured to store and publish credential information for network entities. The credential information may be published as RR groups 200 associated with the entities served by the name server. At block 1304, the key replacer 630 may be configured to establish the secure connection using any standard authentication mechanism (e.g., such as a network login, certificate presentation, LDAP lookup, etc.). Next, control proceeds to block 1308 at which the key replacer 630 selects a particular network domain whose RR group 200 contains the public key corresponding to the public/private key pair to be replaced.

After the domain is selected at block 1308, control proceeds to block 1312 at which the key replacer 630 determines the new public/private key pair to replace the domain's existing public/private key pair. For example, at block 1312 the key replacer 630 may determine the public/private key pair locally based on an appropriate key generation algorithm associated with a supported public key encryption scheme. Additionally or alternatively, the key replacer 630 may be configured to receive the domain's public/private key pair from an external source responsible for key generation and allocation. In any case, after determining the entity's public key/private key pair at block 1312, control proceeds to block 1316 at which the key replacer 630 may generate a new self-signed signature for the domain selected at block 1308 based on the new private key determined at block 1312. To generate the new self-signed signature, the key replacer 630 may be configured to execute at least relevant portions of the example machine readable instructions 1000 of FIG. 10 to: (1) concatenate information included in the RR group 200 associated with the domain to produce a concatenation result, (2) process the concatenation result with a hash result and (3) encrypt the hash result based on a public key encryption algorithm using the new private key determined at block 1312 to generate the new self signed signature.

After processing at block 1316 completes, control proceeds to block 1320 at which the key replacer 630 updates the RR group 200 for the selected domain. The key replacer 630 updates the RR group 200 by updating the KEY RR 210 with the new public key determined at block 1312 and updating the appropriate SIG RR 240-250 with the self signed signature determined at block 1316. Next, control proceeds to block 1324 at which the key replacer 630 selects an entity that is a descendent of the domain selected at block 1308 and, thus, requires replacement of the domain signed signature included in its RR group 200. After selecting a descendent entity for signature replacement at block 1324, control proceeds to block 1328 at which the key replacer 1328 generates a new domain signed signature for the selected descendent entity. To generate the new domain signed signature, the key replacer 630 may be configured to execute at least relevant portions of the machine readable instructions 1000 of FIG. 10 to: (1) retrieve the current RR group 200 associated with the selected descendent entity, (2) concatenate some or all of the information contained in the KEY RR 210 and the zero or more ROLE RRs 220-230 of the selected descendent entity's RR group 200 to produce a concatenation result, (3) process the concatenation result with a hash function to determine a hash result and (4) encrypt the hash result with a public key encryption algorithm using the domain's private key determined at block 1316 to determine the new domain signed signature.

After the new domain signed signature is determined at block 1328, control then proceeds to block 1332 at which the key replacer 1332 updates the RR group 200 for the descendent entity selected at block 1324. For example, the key replacer 630 may update the appropriate SIG RR 240-250 in the descendent entity's RR group 200 to include the new domain signed signature determined at block 1328. Control then proceeds to block 1336 at which the key replacer 630 determines whether all descendent entities affected by replacement of the domain's public/private key pair have been processed. If all affected descendent entities have not been processed (block 1336), control returns to block 1324 and blocks subsequent thereto at which the key replacer 630 selects another descendent entity for domain signed signature replacement. If, however, all affected descendent entities have been processed (block 1336), control proceeds to block 1340 at which the key replacer 630 disconnects the secure connection with the name server that was established at block 1304. Execution of the example machine readable instructions 1300 then ends.

Example machine readable instructions 1400 that may be executed to implement the identity invalidator 640 of FIG. 6 are shown in FIG. 14. The example machine readable instructions 1400 operate to invalidate identity and credential information associated with an entity in, for example, the identity and role management system 100 of FIG. 1. The example machine readable instructions 1400 may be executed, for example, each time an entity's identity and credential information is to be invalidated.

The machine readable instructions 1400 begin execution at block 1404 at which the identity invalidator 640 establishes a secure connection with a name server (e.g., such as name server 170) accessible over a communication network (e.g., communication network 110 of FIG. 1) and configured to store and publish credential information for network entities. The credential information may be published as RR groups

200 associated with the entities served by the name server. At block 1404, the identity invalidator 640 may be configured to establish the secure connection using any standard authentication mechanism (e.g., such as a network login, certificate presentation, LDAP lookup, etc.). Next, control proceeds to block 1408 at which the identity invalidator 640 selects a particular entity (e.g., network user or network domain) for which credential information is to be invalidated.

After the entity is selected at block 1408, control proceeds to block 1412 at which the identity invalidator 640 invalidates the RR group 200 for the entity selected at block 1408. For example, at block 1412 the identity invalidator 640 may be configured to delete the RR group 200 from the name server to prevent the name server from returning the selected entity's credential information in response to an authentication request (e.g., DNS lookup). Control then proceeds to block 1416 at which the identity invalidator 640 disconnects the secure connection with the name server that was established at block 1404. Execution of the example machine readable instructions 1400 then ends.

Example machine readable instructions 1500 that may be executed to implement the identity obfuscator 650 of FIG. 6 are shown in FIG. 15. The example machine readable instructions 1500 operate to obfuscate identity information associated with an entity in, for example, the identity and role management system 100 of FIG. 1. The example machine readable instructions 1500 may be executed each time an entity's identity information is to be obfuscated, for example, when the entity's identity information is to be published, updated, etc.

The machine readable instructions 1500 begin execution at block 1504 at which the identity obfuscator 650 establishes a secure connection with a name server (e.g., such as name server 170) accessible over a communication network (e.g., communication network 110 of FIG. 1) and configured to store and publish credential information for network entities. The credential information may be published as RR groups 200 associated with the entities served by the name server. At block 1504, the identity obfuscator 650 may be configured to establish the secure connection using any standard authentication mechanism (e.g., such as a network login, certificate presentation, LDAP lookup, etc.). Next, control proceeds to block 1508 at which the identity obfuscator 650 selects a particular entity (e.g., network user or network domain) for which the identity information associated with the entity's RR group 200 is to be obfuscated.

After the entity is selected at block 1508, control proceeds to block 1512 at which the identity obfuscator 650 obfuscates the identity information associated with and, for example, used to address the RR group 200 for the entity selected at block 1508. For example, at block 1512 the identity obfuscator 650 may be configured to process the identity information (e.g., such as the identity information Bob@foo.com) associated with the selected entity (e.g., such as the entity Bob in the domain foo.com) with a hash function to produced an obfuscated identity (e.g., such as A390B23F@foo.com). The hash function may be any hash function, such as the MD-2, MD-4 and MD-5 algorithms and the SHS family of algorithms incorporated by reference above. Next, control proceeds to block 1516 at which the identity obfuscator 650 associates the obfuscated identity determined at block 1512 with the RR group 200 associated with the entity selected at block 1508. For example, the obfuscated entity may be stored in the name server and used to address (or reference, index, etc.) the RR group 200 associated with the selected entity. After associating the selected entity with obfuscated identity at block 1516, control then proceeds to block 1520 at which the identity obfuscator 650 disconnects the secure connection with the name server that was established at block 1504. Execution of the example machine readable instructions 1500 then ends.

Example machine readable instructions 1600 that may be executed to implement the role manager 660 of FIG. 6 are shown in FIG. 16. The example machine readable instructions 1600 operate to manage role information associated with an entity in, for example, the identity and role management system 100 of FIG. 1. The example machine readable instructions 1600 may be executed each time an entity's role information is to be managed, such as, for example, when the entity's role information is to be published, updated, etc.

The machine readable instructions 1600 begin execution at block 1604 at which the role manager 660 establishes a secure connection with a name server (e.g., such as name server 160) accessible over a communication network (e.g., communication network 110 of FIG. 1) and configured to store and publish credential information for network entities. The credential information may be published as RR groups 200 associated with the entities served by the name server. At block 1604, role manager 660 may be configured to establish the secure connection using any standard authentication mechanism (e.g., such as a network login, certificate presentation, LDAP lookup, etc.). Next, control proceeds to block 1608 at which the role manager 660 selects a particular entity (e.g., network user or network domain) for which the role information contained in the entity's RR group 200 is to be managed. Control then proceeds to block 1612 at which the role manager 660 determines a role to associate with the entity selected at block 1608. As discussed above, the role manager 660 may determine a role or roles to associate with an entity based on, for example, the position held and/or the function performed by the entity in an organization corresponding to a network domain, a community of users, etc.

In some circumstances, it may be necessary to secure the role information for certain entities. Thus, control proceeds to block 1616 at which the role manager 660 determines whether the role determined at block 1616 is to be secured. If the role does not need to be secured (block 1616), control proceeds to block 1620 at which the role manager 660 includes the role in the appropriate ROLE RR 220-230 of the RR group 200 associated with the entity selected at block 1608 for storage on the name server. If, however, the role does need to be protected (block 1616), control proceeds to block 1624 at which the role manager 660 may associate a privacy keyword with the affected role, such as, for example, the keyword "private." Control then proceeds to block 1620 at which the privacy keyword is stored in the appropriate ROLE RR 220-230 of the RR group 200 associated with the entity selected at block 1608. Additionally, an alternative role server (e.g., such as an LDAP server not shown) may be referenced in the appropriate ROLE RR 220-230 corresponding to this role. As discussed above in connection with FIG. 6, an authenticator authorized to retrieve the secured role information must be configured a priori to communicate with the alternative role server to retrieve the role information for the selected entity.

After storing the role at block 1620, control proceeds to block 1628 at which the role manager 660 determines whether additional roles need to be managed for the entity selected at block 1608. As discussed above, an entity may have multiple roles across multiple domains and/or communities reflective of, for example, roles held or functions performed within the multiple organizations. If there are additional roles to process for the selected entity (block 1628), control returns to block 1612 and blocks subsequent thereto at which another role is selected for processing. If, however, there are no additional roles to process (block 1628), control proceeds to block 1632 at which the role manager 660 disconnects the secure connection with the name server that was established at block 1604. Execution of the example machine readable instructions 1600 then ends.

Figure 17:
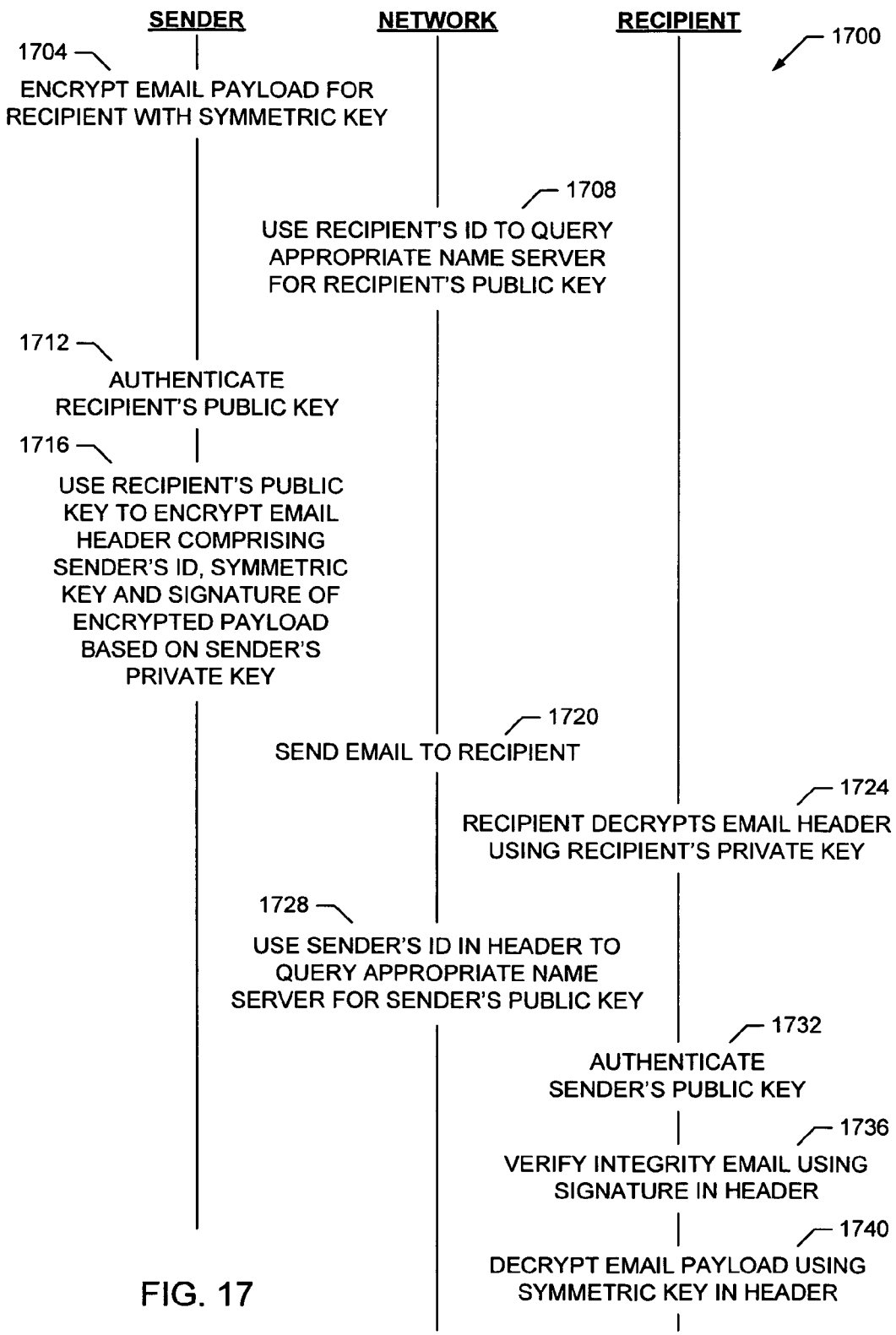
FIG. 17 illustrates an example operation of the system of FIG. 1 to send a secure email from a sender to a recipient.

An example scenario 1700 for sending a secure email between a sender and a recipient in the example identity and role management system 100 of FIG. 1 is illustrated in FIG. 17. The example secure email scenario 1700 begins at event 1704 at which the sender encrypts the payload of an email intended for a recipient using, for example, a known symmetric key encryption algorithm. Next, at event 1708, the sender uses the recipient's identity information as embodied in the recipient's email address to retrieve an RR group 200 associated with the recipient and stored on a name server (e.g., such as the name server 170) serving the recipient. Then, at event 1712, the sender uses the retrieved RR group 200 to authenticate a public key associated with the recipient using the techniques described above.

Using the authenticated public key associated with the recipient, the sender at event 1716 encrypts the entire email for transmission to the recipient. For example, the sender may use a public key encryption algorithm and the recipient's authenticated public key to encrypt the email header, which contains the sender's email address, the symmetric key used to encrypt the payload and a signature signed by the sender's private key to verify the integrity of the payload. Additionally, if the message payload was not already encrypted at event 1704, the sender may also encrypt the payload data with a symmetric key encryption algorithm using the symmetric key included in the email header. Finally, at event 1720, the encrypted email is sent to the recipient. A person of ordinary skill in the art will appreciate that the email encryption may be triggered, for example, by the sender's communication device (e.g., such as the communication device 150 of FIG. 1) and/or by a communication server (e.g., such as the communication server 155) configured to transmit and/or receive communications (e.g., emails) for the sender, etc.

The example secure email scenario continues at event 1724 at which the recipient receives the secure email and decrypts the email header using the recipient's private key. Next, at event 1728, the recipient uses the sender's identity information embodied as the sender's email address included in the email header to retrieve an RR group 200 associated with the sender and stored on a name server (e.g., such as the name server 160) serving the sender. Then, at event 1732, the recipient uses the retrieved RR group 200 to authenticate a public key associated with the sender using the techniques described above. Next, at event 1736, the recipient uses the authenticated sender's public key to verify the integrity of the encrypted email payload.

Finally, at event 1740, with the sender authenticated and the payload integrity validated, the recipient decrypts the payload using the symmetric key included in the email header to view the email message. A person of ordinary skill in the art will appreciate that the email decryption may be triggered, for example, by the recipient's communication device (e.g., such as the communication device 160) and/or by a communication server configured to transmit and/or receive communications (e.g., emails) for the sender, etc. Additionally, authentication of the sender, email decryption and payload validation may be performed prior to display of the message such that these operations are hidden from the email's reader.

In a typical authentication scenario, such as the example secure email scenario 1700, an authentication request for a user's credential information may return, for example, four or five RRs, including one KEY RR, one ROLE RR and two to three SIG RRs. Because all credential information associated with a user is returned in one response (provided chain authentication through, for example, a domain tree is not required) the authentication time is minimized. An authentication request for a network domain's credential information may return a similar number of RRs. Proper authentication may require two or more authentication requests, with a first authentication request to retrieve the credential information associated with the entity to be authenticated and a second authentication request to retrieve and verify a signer's public key. However, the total number of authentication requests may be minimized by providing sufficient authentication chains for an authenticator to follow.

Persons of ordinary skill in the art will appreciate that the techniques for identity and role management disclosed herein support multiple authentication schemes by which an entity may be granted trust and no single authority is required to be the sole source of trust. Additionally, authentication and security is not dependent on a single master key maintained by a key generation server. Yet, even without a centralized source of trust or key management, credential information may be published and distributed quickly and efficiently to entities within the communication network.

The provisioning of roles associated with network entities further increases the flexibility and functionality of a communication network employing the identity and role management techniques disclosed herein. A person of ordinary skill in the art will appreciate that the authentication of an entity's role(s) requires no additional infrastructure over that already required to authenticate an entity's identity. Roles may exist local to an organization (e.g., such as local to a network domain) or exist across a community (e.g., such as defined for an ad hoc group of entities belonging to multiple organizations and/or network domains). Furthermore, an entity may be associated with more than one role, with the entity's plurality of roles associated with the same identity or a plurality of identities. The techniques described herein are flexible and permit an entity to associate roles with only particular identities such that only certain roles are returned in response to an authentication request based on one of the entity's identities.

The examples in the preceding disclosure focused on retrieving credential information associated with an entity to be authenticated by sending an authentication request to an appropriate name server based on the entity's identity. However, the techniques described herein also support authentication requests based on an entity's role information. For example, an authenticator may not know the particular identity of the entity with which communication is desired, but the authenticator may know the entity's role in, for example, a particular domain or community. The authenticator may use this role information to send an authenticate request to the appropriate name server. The name server may then process the authentication request based on the role information to determine which entity associated with that role will have its credential information included in the response to the authenticator.

As an example, a network domain associated with an identity foo.com may define a role system-administrator to associate with a plurality of entities within its domain. An authenticator may wish to communicate with a system-administrator at foo.com, but not care with which particular entity communication occurs. The authenticator may send an authentication request based on an identifier system-administrator@foo.com over the communication network which is routed to the name server serving foo.com. The name server may then select one of the entities associated with the role system-administrator based on, for example, some predetermined scheme (e.g., such as a round-robin scheme). The name server would then return the credential information associated with the selected entity in response to the authentication request. A person of ordinary skill in the art will appreciate that this is but one example of how role information may be used within a system employing identity and role management.

Figure 18:
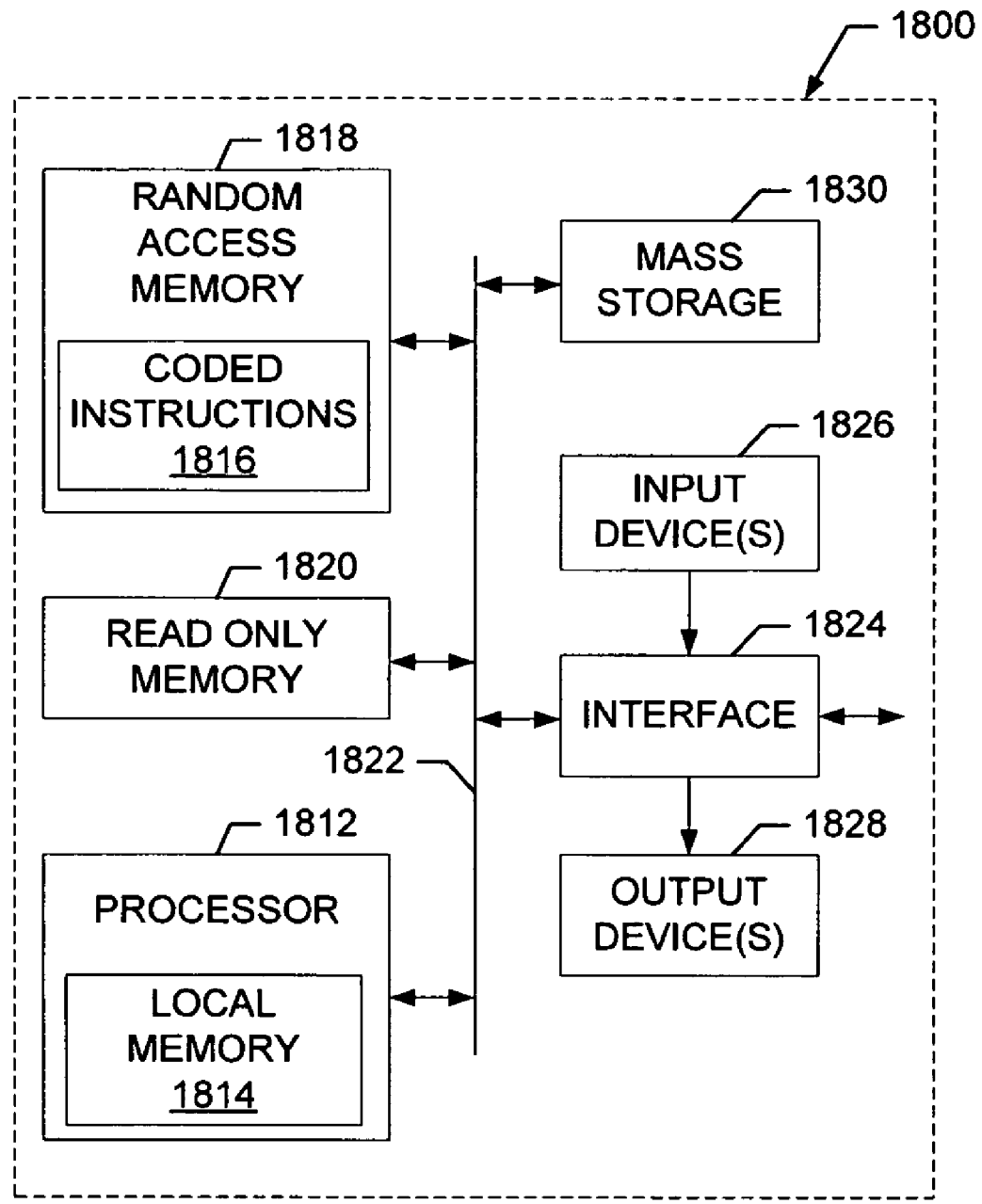
FIG. 18 is a block diagram of an example computer that may execute the example machine readable instructions of FIGS. 7, 8A-8B and/or 10-16 to implement the example system of FIG. 1.

FIG. 18 is a block diagram of an example computer 1800 capable of implementing the apparatus and methods disclosed herein. The computer 1800 can be, for example, a server, a personal computer, a personal digital assistant (PDA), an Internet appliance, a DVD player, a CD player, a digital video recorder, a personal video recorder, a set top box, or any other type of computing device.

The system 1800 of the instant example includes a processor 1812 such as a general purpose programmable processor. The processor 1812 includes a local memory 1814, and executes coded instructions 1816 present in the local memory 1814 and/or in another memory device. The processor 1812 may execute, among other things, the machine readable instructions represented in FIGS. 7, 8A-B and 10-16. The processor 1812 may be any type of processing unit, such as one or more microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1812 is in communication with a main memory including a volatile memory 1818 and a non-volatile memory 1820 via a bus 1822. The volatile memory 1818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1820 may be implemented by flash memory and/or any other desired type of memory device. Access to the main memory 1818, 1820 is typically controlled by a memory controller (not shown) in a conventional manner.

The computer 1800 also includes a conventional interface circuit 1824. The interface circuit 1824 may be implemented by any type of well known interface standard, such as an Ethernet interface, a universal serial bus (USB), and/or a third generation input/output (3GIO) interface.

One or more input devices 1836 are connected to the interface circuit 1824. The input device(s) 1836 permit a user to enter data and commands into the processor 1812. The input device(s) can be implemented by, for example, a keyboard, a mouse, a touchscreen, a track-pad, a trackball, an isopoint and/or a voice recognition system.

One or more output devices 1828 are also connected to the interface circuit 1824. The output devices 1828 can be implemented, for example, by display devices (e.g., a liquid crystal display, a cathode ray tube display (CRT)), by a printer and/or by speakers. The interface circuit 1824, thus, typically includes a graphics driver card.

The interface circuit 1824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1800 also includes one or more mass storage devices 1830 for storing software and data. Examples of such mass storage devices 1830 include floppy disk drives, hard drive disks, compact disk drives and digital versatile disk (DVD) drives. The mass storage device 1830 may be used, for example, to store RR groups 200. Alternatively, the volatile memory 1818 may be used to store RR groups 200.

At least some of the above described example methods and/or apparatus may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for identity and role management in a communication network, the method comprising
associating an entity with a key;
associating the entity with a role;
associating the key and the role with a signature;
providing an identity of the entity, the key, the role and the signature to be accessed through the communication network in response to an authentication query specifying the role but not identifying the entity, the entity being selected from a set of entities each associated with the role specified in the authentication query, wherein the providing comprises publishing a resource record group comprising the key, the role and the signature in a name server communicatively coupled to the communication network, wherein the resource record group is associated with the identity; and
receiving a communication message routed through the communication network based on the provided identity of the entity and not the role specified in the authentication query, the identity being different from the role.

2. A method as defined in claim 1 wherein the entity comprises one of a network user or a network domain.

3. A method as defined in claim 1 wherein the key is a public key for use with an encryption algorithm.

4. A method as defined in claim 1 wherein the role corresponds to at least one of a position or a function associated with at least one of a network domain or a community of entities.

5. A method as defined in claim 4 wherein the network domain corresponds to a business organization and the community of entities corresponds to a plurality of entities that belong to a plurality of network domains.

6. A method as defined in claim 1 wherein the role is associated with a plurality of entities.

7. A method as defined in claim 1 wherein associating the key and the role with the signature comprises generating the signature based on the key and the role.

8. A method as defined in claim 7 wherein the key is a first key and generating the signature comprises encrypting the first key and the role based on a second key.

9. A method as defined in claim 8 wherein the first key and the second key comprise, respectively, a public key and a private key for use with an encryption algorithm.

10. A method as defined in claim 8 wherein the second key is associated with at least one of the entity, a domain to which the entity belongs or a community to which the entity belongs.

11. A method as defined in claim 8 wherein encrypting the first key and the role based on the second key comprises:
concatenating the first key and the role to determine a concatenation result;
processing the concatenation result with a hash function to determine a hash result; and
processing the hash result with an encryption algorithm based on the second key.

12. A method as defined in claim 11 wherein the hash function comprises at least one of a message digest algorithm or a secure hash standard algorithm.

13. A method as defined in claim 11 wherein the encryption algorithm comprises at least one of a digital signature algorithm or an RSA algorithm.

14. A method as defined in claim 1 wherein the name server comprises a domain name system server.

15. A method as defined in claim 1 wherein the name server comprises one of a plurality of name servers and the identity is uniquely associated with the name server.

16. A method as defined in claim 1 wherein the identity comprises at least one of an email address, a domain name, a network address or an instant messaging identity.

17. A method as defined in claim 1 further comprising obfuscating the identity of the entity prior to publishing the resource record group in the name server.

18. A method as defined in claim 1 wherein providing the identity of the entity, the key, the role and the signature to be accessed through the communication network in response to the authentication query comprises updating a resource record group comprising the key, the role and the signature in a name server communicatively coupled with the communication network, wherein the resource record group is associated with the identity.

19. A method as defined in claim 1 wherein the role is a first role and further comprising:
associating the entity with the second role;
associating the second role with the signature; and
providing the identity of the entity, the key, the first role, the second role and the signature through the communication network in response to the authentication query specifying at least one of the first role or the second role and not identifying the entity.

20. A method as defined in claim 1 wherein the signature is a first signature and further comprising:
associating the key and the role with a second signature; and
providing the identity of the entity, the key, the role, the first signature and the second signature through the communication network in response to the authentication query.

21. An article of manufacture storing machine readable instructions on a non-transitory storage medium which, when the machine readable instructions are executed by at least one processor, cause a machine comprising the at least one processor to:
associate the entity with a key;
associate the entity with a role;
associate the key and the role with a signature;
provide an identity of the entity, the key, the role and the signature to be accessed through a communication network in response to an authentication query specifying the role but not identifying the entity, the entity being selected from a set of entities each associated with the role specified in the authentication query, wherein providing the identity, the key, the role, and the signature comprises publishing a resource record group comprising the key, the role and the signature in a name server communicatively coupled to the communication network, wherein the resource record group is associated with the identity; and
receive a communication message routed through the communication network based on the provided obfuscated identity of the entity and not the role specified in the authentication query, the obfuscated identity being different from the role.

22. An article of manufacture as defined in claim 21 wherein the machine readable instructions, when executed, further cause the machine to generate the signature based on the key and the role.

23. An article of manufacture as defined in claim 22 wherein the key is a first key and the machine readable instructions, when executed, further cause the machine to generate the signature by encrypting the first key and the role based on a second key.

24. An article of manufacture as defined in claim 23 wherein the first key and the second key comprise, respectively, a public key and a private key for use with an encryption algorithm.

25. An article of manufacture as defined in claim 23 wherein the machine readable instructions, when executed, further cause the machine to generate the signature by:
- concatenating the first key and the role to determine a concatenation result;
- processing the concatenation result with a hash function to determine a hash result; and
- processing the hash result with an encryption algorithm having the second key as an input.

26. An identity manager for identity and role management in a communication network, the identity manager comprising
- a role manager comprising computer program instructions stored on at least one non-transitory medium, wherein said role manager is to determine a role to associate with an entity, and to associate a keyword with the role;
- a credential manager comprising computer program instructions stored on at least one non-transitory medium, wherein said credential manager is to:
  - associate a key with the entity; and
  - associate a signature with the key and the role;
- an identity publisher comprising computer program instructions stored on at least one non-transitory medium, wherein said identity publisher is to provide an identity of the entity, the key, the role and the signature to be accessed through the communication network in response to an authentication query specifying the role but not identifying the entity, the entity being selected from a set of entities each associated with the role specified in the authentication query, wherein providing the entity, the key, the role, and the signature comprises publishing a resource record group comprising the key, the role and the signature in a name server communicatively coupled to the communication network, wherein the resource record group is associated with the identity;
- a role server comprising computer program instructions stored on at least one non-transitory medium, wherein said role server is to provide the role to the authenticator to replace the keyword provided by the resource record group when the authenticator is determined to be authorized to access the role, the resource record group also including a reference to the role server to enable the authenticator to access the role server.

27. An identity manager as defined in claim 26 further comprising an identity updater to update at least one of the key, the keyword associated with the protected role or the signature included in the resource record group.

28. An identity manager as defined in claim 26 further comprising an identity obfuscator to obfuscate the identity and associate the resource record group with the obfuscated identity.

29. An identity manager as defined in claim 28 wherein the identity obfuscator is to obfuscate the identity by processing the identity with a hash function.

30. An identity manager as defined in claim 26 further comprising an identity invalidator is to inhibit access to the resource record group over the communication network.

31. An identity manager as defined in claim 30 wherein the identity invalidator is to inhibit access to the resource record group over the communication network by removing the resource record group from a name server communicatively coupled to the communication network.

32. An identity manager as defined in claim 26 wherein the signature is a first signature and further comprising a key replacer to determine a second signature to replace the first signature.

33. An identity manager as defined in claim 32 wherein the key is a first key and the first signature and the second signature are associated with a network domain to which the entity belongs, and wherein the key replacer is to replace the first signature with the second signature when a second key associated with the network domain is replaced with a third key.

34. An identity manager as defined in claim 26 wherein the credential manager is to generate the signature based on the key and the protected role.

35. An identity manager as defined in claim 34 wherein the key is a first key and the credential manager is to generate the signature by encrypting the first key and the protected role based on a second key.

36. An identity manager as defined in claim 35 wherein the first key and the second key comprise, respectively, a public key and a private key for use with an encryption algorithm.

37. An identity manager as defined in claim 35 wherein the credential manager is to encrypt the first key and the protected role based on the second key by:
- concatenating the first key and the protected role to determine a concatenation result;
- processing the concatenation result with a hash function to determine a hash result; and
- processing the hash result with an encryption algorithm based on the second key.

38. A system comprising:
- a name server, comprising hardware, communicatively coupled to a communication network, the name server to associate a plurality of identities and a plurality of roles associated with a plurality of entities in the communication network;
- an identity manager, comprising hardware, communicatively coupled to at least one of the communication network or the name server, the identity manager to provide an identity of an entity, a key, a role and a signature to be accessed through the communication network in response to an authentication query specifying the role but not identifying the entity, the entity being selected from a set of entities each associated with the role specified in the authentication query, wherein providing the identity, the key, the role, and the signature comprises publishing a resource record group comprising the key, the role and the signature in a name server communicatively coupled to the communication network, wherein the resource record group is associated with the identity, wherein said identity manager manages the plurality of identities and the plurality of roles associated with the plurality of entities; and
- an authentication processor, comprising hardware, communicatively coupled to the communication network, the authentication processor to authenticate an identity and a role associated with an entity provided by the name server in response to an authentication query specifying the role associated with the entity but not identifying the entity.

39. A system as defined in claim 38 wherein the name server is to serve a plurality of resource record groups comprising the plurality of roles and associated with the plurality of identities.

40. A system as defined in claim 38 wherein the identity manager is to determine a plurality of signatures associated with the plurality of entities and based on the plurality of roles and at least one key.

* * * * *